United States Patent
Friehauf

(10) Patent No.: US 11,984,040 B2
(45) Date of Patent: May 14, 2024

(54) METHODS AND SYSTEMS OF AUTOMATICALLY CREATING DIGITAL SPORT PLAYBOOKS

(71) Applicant: The Ready List, Inc., Brush, CO (US)

(72) Inventor: Chad Friehauf, Brush, CO (US)

(73) Assignee: The Ready List, Inc., Brush, CO (US)

( * ) Notice: Subject to any disclaimer, the term of this patent is extended or adjusted under 35 U.S.C. 154(b) by 429 days.

(21) Appl. No.: 17/319,905

(22) Filed: May 13, 2021

(65) Prior Publication Data

US 2021/0354017 A1     Nov. 18, 2021

Related U.S. Application Data

(60) Provisional application No. 63/024,905, filed on May 14, 2020.

(51) Int. Cl.
*G09B 19/00*    (2006.01)
(52) U.S. Cl.
CPC ................ *G09B 19/0038* (2013.01)
(58) Field of Classification Search
CPC ................................ G09B 19/0038
See application file for complete search history.

(56) References Cited

U.S. PATENT DOCUMENTS

| | | | |
|---|---|---|---|
| 10,803,764 B2 | 10/2020 | Friehauf | |
| 10,861,200 B1 * | 12/2020 | Graham | G06T 13/80 |
| 2006/0247808 A1 | 11/2006 | Robb | |
| 2012/0122061 A1 | 5/2012 | Dohring et al. | |
| 2013/0139068 A1 | 5/2013 | Bowring | |
| 2020/0023262 A1 * | 1/2020 | Young | G06N 3/044 |

OTHER PUBLICATIONS

Go Army Edge Football, "Use the Route Tree in GoArmy Edge to save movements . . . " https://www.facebook.com/watch/?v=496399997575950. Sep. 24, 2019 (Year: 2019).*
"Go Army Play Builder—Football Virtual Reality." https://www.youtube.com/watch?v=GzgUBLzHj6U. 2016 (Year: 2016).*
"Create a Play Melee on John Madden Football." https://www.youtube.com/watch?v=K6Rt8e5K_jY. 2014 (Year: 2014).*
Official Action for U.S. Appl. No. 14/296,725, dated Apr. 7, 2016 14 pages.
Official Action for U.S. Appl. No. 14/296,725, dated Dec. 29, 2016 18 pages.
Examiner's Answer for U.S. Appl. No. 14/296,725, dated Nov. 30, 2017 11 pages.
Decision on Appeal for U.S. Appl. No. 14/296,725, dated Apr. 2, 2020 14 pages.
Notice of Allowance for U.S. Appl. No. 14/296,725, dated Jun. 9, 2020 6 pages.

* cited by examiner

*Primary Examiner* — Reginald A Renwick
(74) *Attorney, Agent, or Firm* — Sheridan Ross P.C.

(57) ABSTRACT

Methods and systems for automatically creating a digital playbook. A processor receives image data. The processor stores the image data in memory. The processor detects a first play illustration in the image data. The processor analyzes the first play illustration. Based on the analysis of the first play illustration, the processor detects features of the play. The processor generates a data file for the first play. The processor stores the data file for the first play in memory.

20 Claims, 20 Drawing Sheets

| DESCRIPTION |
|---|
| • A-GAP FAIR CHECK<br>• VS. ODD/UNDER = THINK ZONE<br>• VS. OVER/BEAR = THINK LEAD<br>• PERIMETER PRESSURE MAKES UNFAIR |

Player Data File 800

| Player ID | Field Position | Route | Player Position | Notes |
|---|---|---|---|---|
| RB | 0, -4 | Left route 1 | RB | |
| FB | 0, -6 | | FB | |
| WR1 | -12, 0 | Long 2 | WR | |
| WR2 | 14, 0 | QuickOut3 | WR | |
| QB | 0, -2 | | QB | |
| LT | -6, 0 | | LT | |
| LG | -3, 0 | | LG | |
| C | 0, 0 | | C | |
| RG | 3, 0 | | RG | |
| RT | 6, 0 | | RT | |
| TE | -9, -2 | | TE | |

Fig. 8A

Play Data 850

| | Play Data |
|---|---|
| Team: | Ducks |
| Playbook: | Fall2019 |
| Author: | J. Smith |
| Side: | Offense |
| Play Name: | Left X Hitch |
| Formation: | Power I |
| Personnel: | 11 |
| General Notes: | |

METHODS AND SYSTEMS OF AUTOMATICALLY CREATING DIGITAL SPORT PLAYBOOKS

CROSS REFERENCE TO RELATED APPLICATIONS

This application claims the benefit of priority under 35 U.S.C. § 119(e) from U.S. Provisional Application Ser. No. 63/024,905, filed May 14, 2020, which is incorporated herein by reference in its entirety.

FIELD

The present disclosure is generally directed to a computer system and more particularly to methods and systems of analyzing a playbook.

BACKGROUND

Sports are an important part of culture around the world. Sports play an important role in the life of people and create large amounts of revenue for professional athletes and other members of professional sport teams.

Many sports are played using a number of different strategies or plans of action. Such plans may be called plays in some sports. For example, in American football, a play may begin either at the snap of the football or at kickoff. As another example, in hockey, a play may begin upon a particular player receiving a puck. Plays may provide instructions for all players on a team on the field at the start of a play.

Plays may comprise a set of instructions for each player on a team. Instructions may be illustrated on paper by drawings of shapes. For example, in American football, each player's starting position may be drawn as a particular shape such as an oval or square. Each player's role during the play may be illustrated by an arrow, line, or other shape.

The illustration of plays may be customized depending on the sport, team, coach, player, etc. Even within a single sport, there may be an infinite number of ways to visualize a single play.

Keeping track of the myriad of ways of visualizing plays is an important part of succeeding at a sport. Succeeding at a sport is a critical demand of a professional team. As such, spreading the knowledge of plays quickly between all members of a team is highly related to the financial success of the team as an organization.

BRIEF DESCRIPTION OF THE DRAWINGS

The features, aspects, and advantages of the apparatus and methods of the present disclosure will become better understood with regard to the following description, appended claims, and accompanying drawings, where:

FIG. 8A shows an illustration of a database in accordance with embodiments of the present disclosure;

FIG. 8B shows an illustration of a database in accordance with embodiments of the present disclosure;

FIG. 14C shows a user interface window in accordance with embodiments of the present disclosure.

DESCRIPTION

Figure 1:
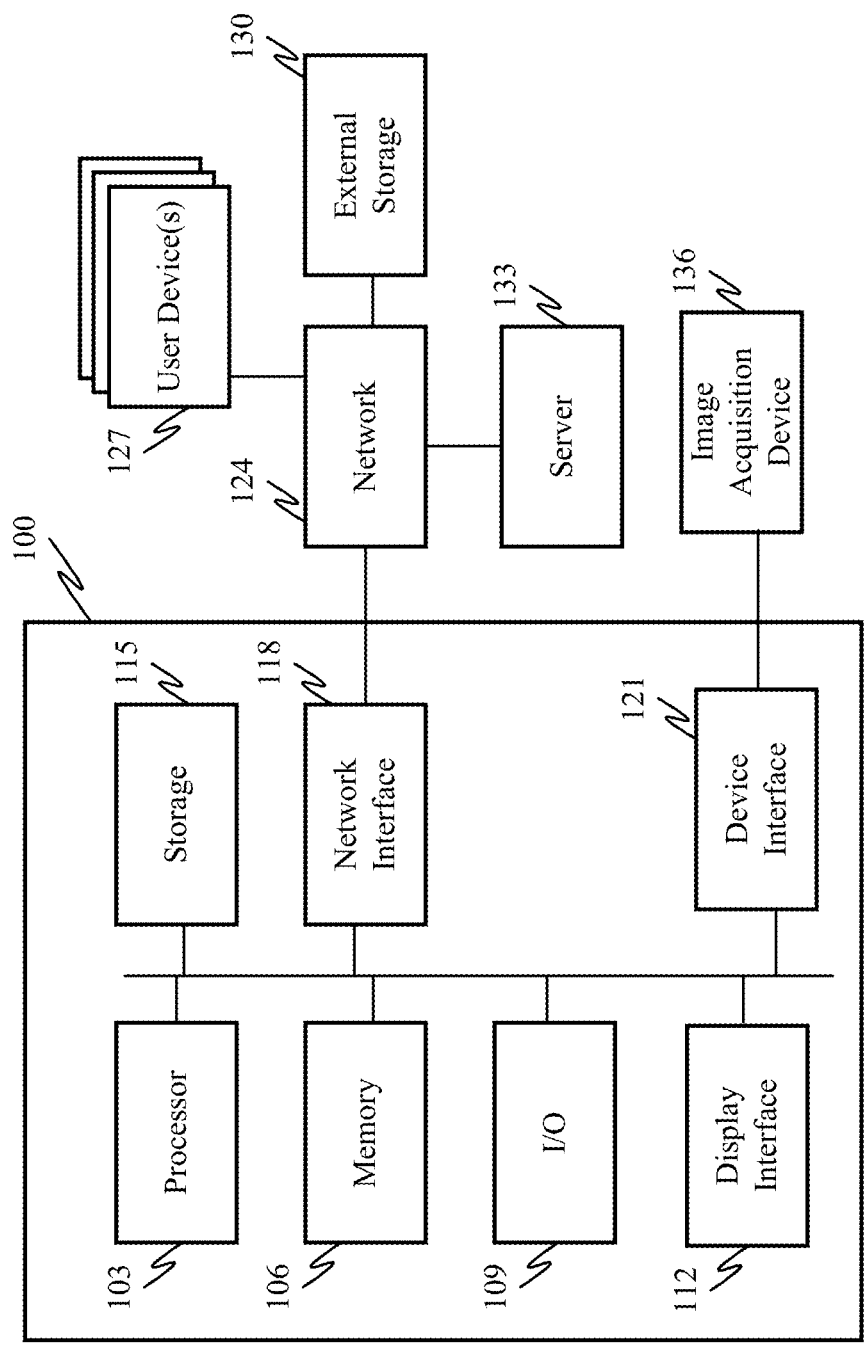
FIG. 1 shows an illustration of a computer system environment in accordance with embodiments of the present disclosure.

Despite the importance of illustrating a play in a way such that every player on a team may quickly learn his or her role in the play, there is no clear standard in most sports as to how a play is drawn. Each team may have a number of different coaches and each coach may have his or her own way of illustrating plays. A different coach may use a different shape to illustrate particular plays or particular instructions for each player.

A group of illustrated plays may be defined as a playbook. Many playbooks are carefully guarded so as not to be accessible by other teams. Often coaches are hesitant to digitally create a playbook to avoid the risk of the playbook being digitally stolen by another team. At the same time, playbooks must be capable of being freely shared between members of a team. Also, using software-based learning methods may greatly reduce the amount of time it takes a player to learn a group of plays. For these reasons, what is needed is a way to quickly interpret, digitize, and standardize a large number of plays in a small amount of time.

Embodiments of the present disclosure relate to providing playbook and play recognition and analysis methods and systems using an automated process involving artificial intelligence systems such as convolutional neural networks. In certain embodiments, a convolutional neural network (CNN) is implemented and trained to analyze images of plays of a sport or activity and learn to detect features, thus enabling a computer program to automatically identify play features and classify plays based on identified features. For example, embodiments of the present disclosure provide methods and systems for automatically identifying characteristics of plays such as sport, side (i.e., offense/defense), player routes, play names, coach notes, etc. using a trained neural network. In certain embodiments, an image representation of a play may be generated and used as an input to an artificial intelligence system. Using an artificial intelligence system, one or more features of the play may be detected automatically, and the play may be automatically tagged or categorized by such features. Using this process, a database of plays with common features may be automatically populated. In some embodiments, a playbook comprising multiple pages with one or more plays on each page may be used as an input. The artificial intelligence system may be capable of identifying a single play among multiple plays in a single image file.

Neural networks have been used to automatically identify patterns or features in images and to use identified patterns and features to categorize images based on the existence of patterns and features in each image. Disclosed herein are embodiments in which a neural network may be trained to identify features of a play and to automatically classify the play into a number of categories.

Neural networks or other artificial intelligence systems have been shown to successfully perform image classification and recognition. Localized convolutions to three-dimensional (3D) neurons have been able to capture latent features as well as other explicit features on images such as patterns, colors, brightness, etc.

Disclosed herein are methods and systems using an artificial intelligence system such as a convolutional neural network to learn to identify play characteristics based upon images of one or more plays. A rationale behind such an approach is that most features associated with a play, such as play name, play type, player symbols, player routes, player notes, coach notes, etc. may be revealed using various filters in a neural network. Without an automated method such as described herein, manual entry of plays into a digital system may be required. Manual entry of plays may take an exceedingly long amount of time and may be at risk of human data entry error.

Because of the high number of different plays used by teams, and the short amount of time between games and seasons, taking a long amount of time to enter plays manually, without an automated method as described herein, can result in under-trained players which may lead to lost games. Furthermore, by enabling plays to automatically be entered into a digital system as described herein, human data-entry error can be avoided, resulting in better trained players which may lead to wins. Also, by providing a more time-efficient system for entering plays into a digital system, using systems and methods as described herein, players can spend more time physically training and less time studying. Players who are better trained are more likely to remain or become hired by a professional sports team and sports teams which win more games are more likely to be more profitable. For these reasons, the systems and methods of automatically entering plays into digital systems result in real success for both players and teams.

The artificial intelligence systems may in some embodiments be executed using CUDA® computation framework using NVIDIA® GTX-1080 GPU infrastructures.

Certain embodiments described herein relate to converting plays and/or playbooks of plays into a digital format capable of being viewed and/or edited by a computer application. It should be appreciated plays may be displayed in a two-dimensional or three-dimensional view. In some embodiments, plays created in a first format may be converted to a second format capable of being displayed in three-dimensions and/or executed in a simulation. For example, a play and/or playbook created in an application such as Visio™ may be converted into a format capable of being displayed in a three-dimensional view using a virtual reality (VR) headset or a video game display device. In this way, plays and/or playbooks of plays may be displayed in a three-dimensional viewpoints. Three-dimensional viewpoints of plays may be displayed as part of a VR simulation or video game. For example, plays may be converted to a format capable of being used in a video game. Such a system may provide an application for players to practice plays from a real playbook in a hands-on way alone or with others away from the field.

In some embodiments, files containing one or more plays or playbooks may be converted to a form capable of being executed by a system controlling remote-control tackling dummies. For example, a team may use tackling dummies for tackling drills. Tackling dummies may be remotely controlled by a computer system. The computer system may use computer files of a particular format containing a play or plays to control one or more dummies. The computer system may be capable of operating multiple dummies in synchronization based on the files to execute a play with the dummies.

As an example, during seven-on-seven passing drills, dummies may be operated to simulate offensive and/or defensive linemen to provide a quarterback the feel of people moving and/or rushing in front of him or her before throwing the football. The dummies may also simulate one or more defensive backs in coverage or receivers that might catch a football from the quarterback. In some embodiments, as opposed to or in addition to tackling dummies, moving targets may be used.

In accordance with one or more embodiments described herein, targets and/or dummies may be controlled by a computer system to take actions based on a drawing of a play. The drawing of the play may be converted into a particular format such that the play may be interpreted properly by a computer system capable of controlling dummies and/or targets.

Similarly, a jugs machine (i.e., a pitching machine for footballs) may be used to throw footballs to receivers. In some embodiments, receivers may wear a tracking device such as a global positioning system (GPS) device. Certain aspects of the disclosed systems and methods may be used to provide instructions to such a machine or other type of machine, such as a pitching machine for baseballs, a tennis ball launching machine, etc. Receivers may be instructed to run particular routes while a jugs machine tracks the player and throw a ball as would a quarterback. In some embodiments, drawings from one or more plays or playbooks may be used as an input to such a machine such that the machine may be enabled to determine a route a receiver should run based on a play and launch the ball in the proper direction based on the determined route. In this way, a jugs machine may be used to simulate a quarterback executing a particular play to train receivers to catch balls while running routes based on a particular play. The plays used to operate the jugs machine may be sourced from a document containing one or more plays or playbooks which may be converted to a file type readable by a computer system controlling the jugs machine.

Embodiments of the present disclosure will be described in connection with a playbook analysis system comprising a neural network. A description of example embodiments of the disclosure follows.

As described herein, a computer program may be capable of receiving playbooks in the form of raw image files, scanning and recognizing plays, and outputting a standardized representation of each playbook as a digital file.

As illustrated in FIG. 1, a computing device 100 may comprise a processor 103, a memory device 106, input/output device 109, a display interface 112, a data storage device 115, a network interface 118, a device interface 121, and/or other computer elements.

The computing device 100 in some embodiments may be connected to a network 124 such as the Internet or a private network. Via the network 124, the computing device 100 may be in communication with one or more user devices 127. User devices 127 may comprise one or more smartphones, tablet computers, laptops, personal computers, etc. The computing device 100 may also be in communication with one or more external storage devices 130 and/or servers 133.

The computing device 100 may be capable of receiving copies of plays and/or playbooks. For example, the computing device 100 may be in communication with one or more image acquisition devices 136 such as cameras, scanners, etc. An image acquisition device 136 may be capable of converting physical copies of plays and/or playbooks to digital files to be interpreted by the processor 103 of the computing device 100.

In some embodiments, the computing device 100 may be capable of receiving input through one or more of Smart boards, iPad, iPhones, etc.

In some embodiments, plays may begin as physical copies of plays on paper or as digital files such as PDF, BMP, JPEG, etc. For example, a play may be typed and/or drawn on a computer or drawn by hand. A single sheet of paper may comprise a number of plays. For example, plays may be in a row or grid. In some cases, a line may separate plays while in other cases there may be no separation between plays.

Figure 2:
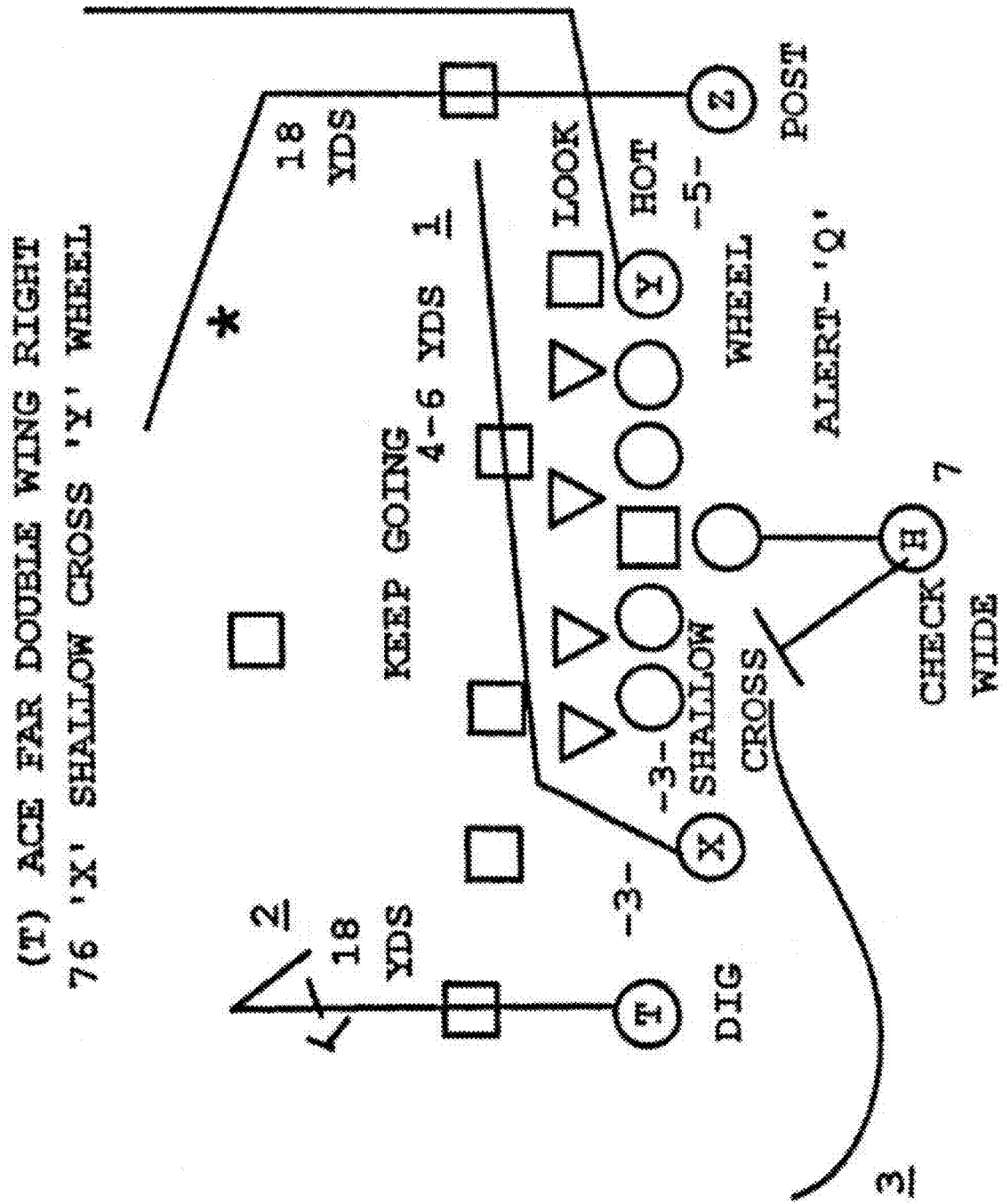
FIG. 2 shows an illustration of a pre-processed football play in accordance with embodiments of the present disclosure.
Figure 3:
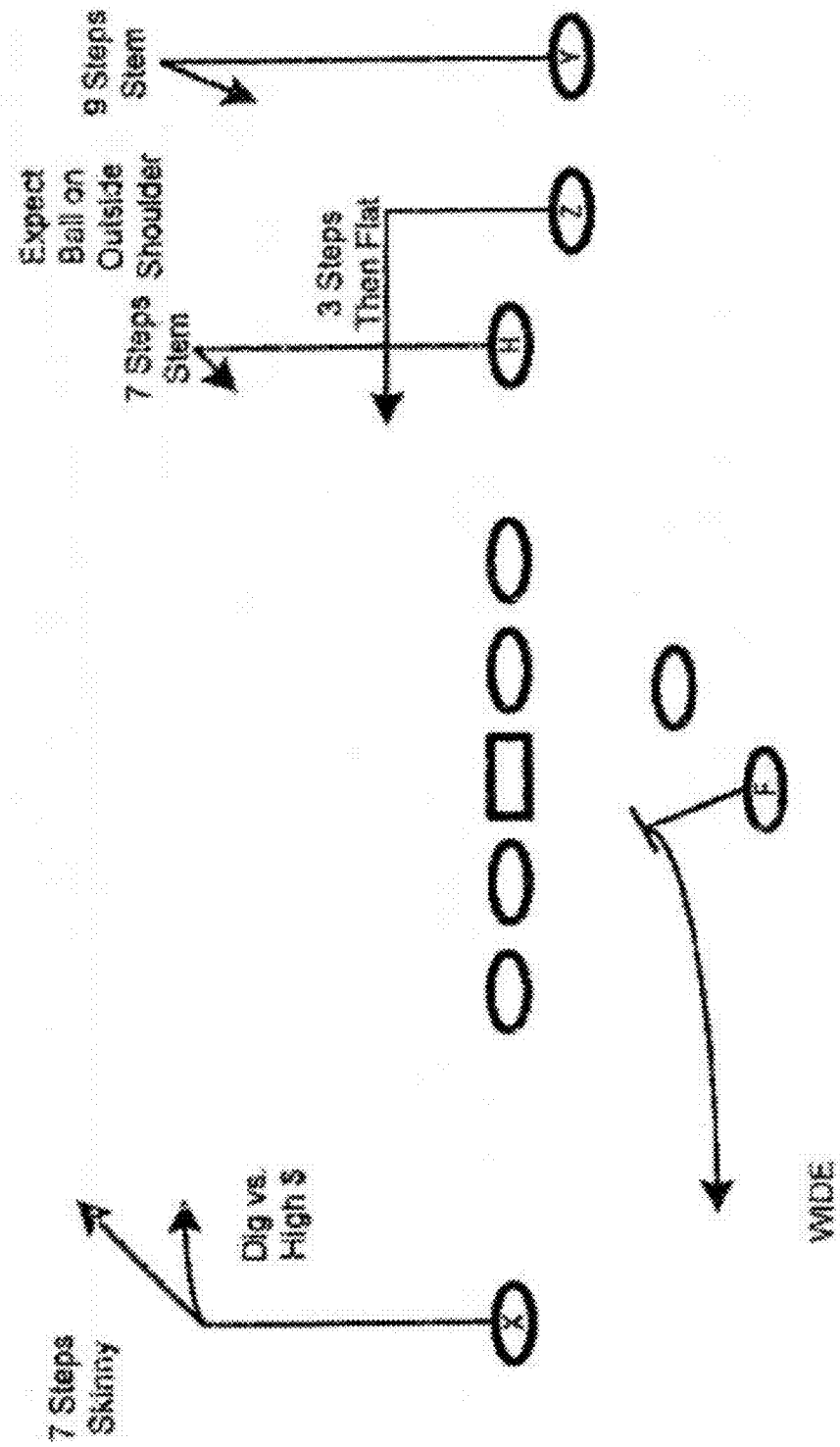
FIG. 3 shows an illustration of a pre-processed football play in accordance with embodiments of the present disclosure.

As illustrated in FIGS. 2 and 3, a play may comprise a wide range of various shapes, lines, text, numbers, etc. For example, a circle may represent an offensive player, a triangle may represent a defensive player, squares may represent either a center of the offensive side or a defensive player. Possible receivers may be indicated by letters within the shape of a player. Lines and arrows may represent routes or motions for players to follow during the action of a play. Text may represent a number of different information, such as play details, notes, titles, or other identifying information.

Plays from various playbooks may have a significant number of differences even if the sport is the same. For example, a play 300 as illustrated in FIG. 3 may omit any representation of players of an opposing side.

Plays may also have a combination of typed and handwritten notes. As illustrated in FIGS. 2 and 3, a play may have lines, notes, etc. written in hand in addition to typed play names, notes, position names, etc.

Figure 4:
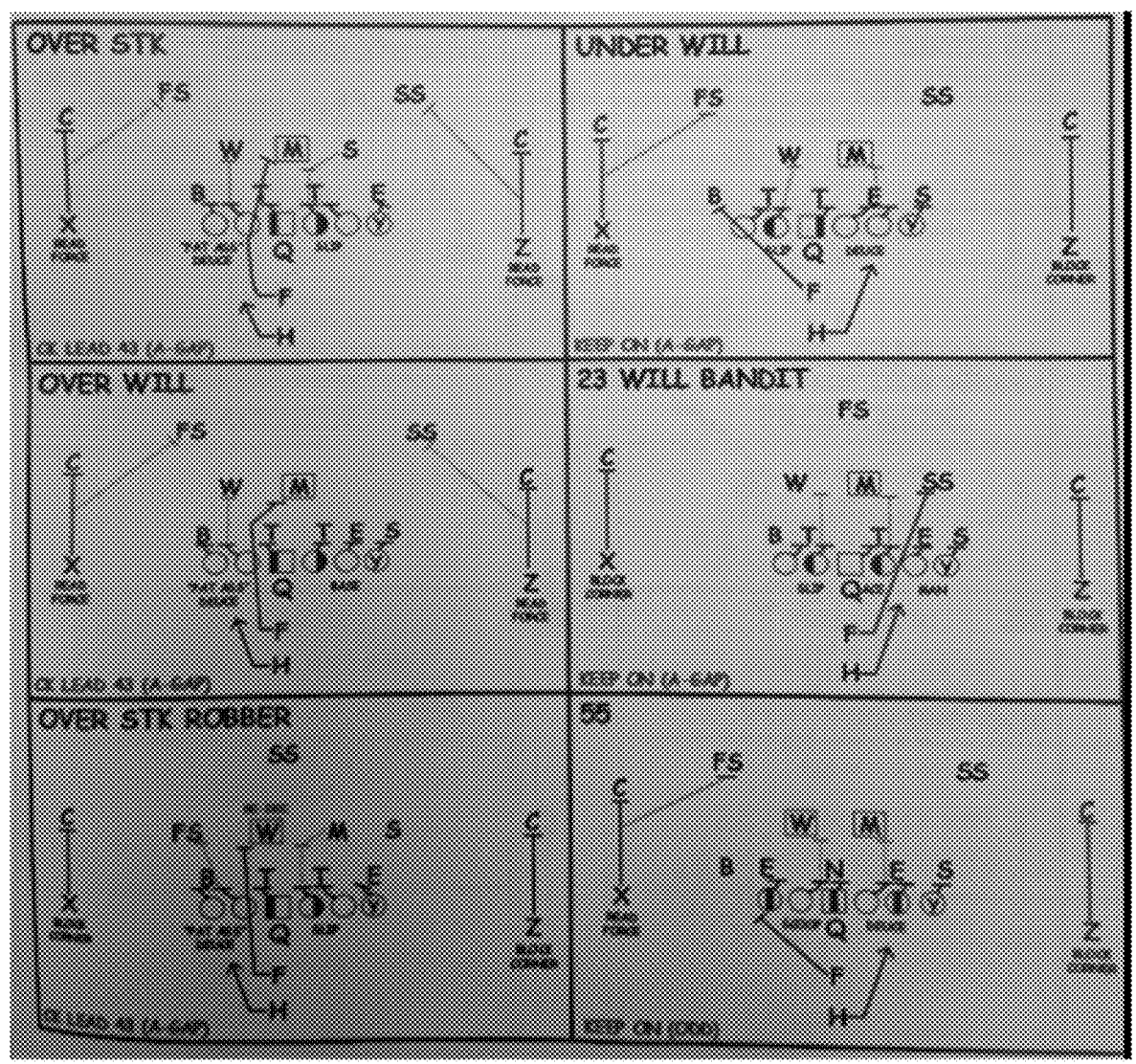
FIG. 4 shows an illustration of a page of a pre-processed football playbook in accordance with embodiments of the present disclosure.
Figure 5:
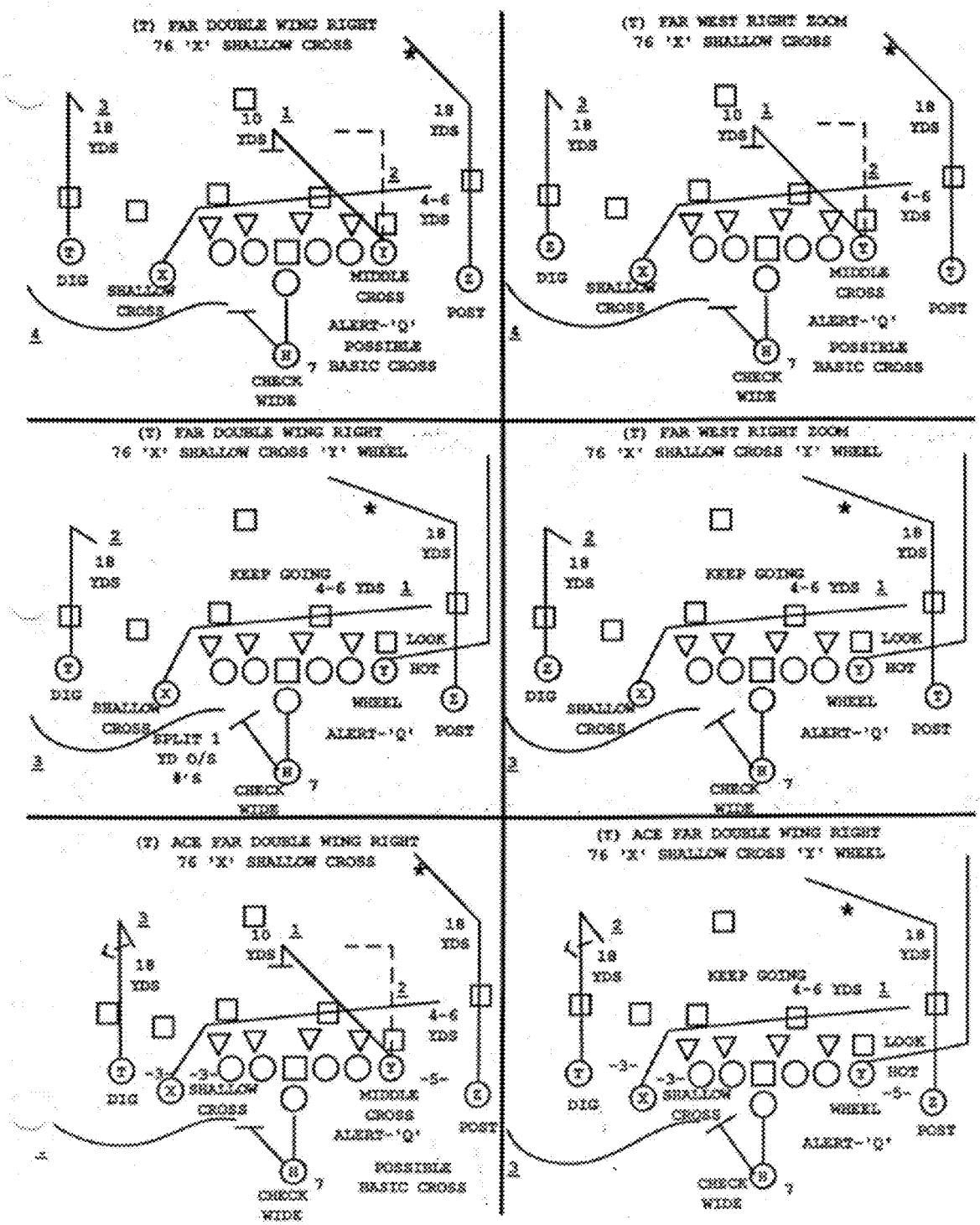
FIG. 5 shows an illustration of a page of a pre-processed football playbook in accordance with embodiments of the present disclosure.

A group or set of plays may be considered to be a playbook. For example, playbooks may comprise one or more pages and each page may comprise one or more plays. For example, as illustrated in FIGS. 4 and 5, a single page of a playbook may comprise multiple plays. In some cases, a page of a playbook may also contain information related to one or more plays on the same page. As illustrated in FIG. 4, a description box may provide notes, columns of plays may have headings, and other data may relate to one or more of the plays on the page.

A playbook may be associated with one or more coaches, teams, players, etc. A coach, team, or player may be associated with one or more playbooks. Plays are often created by coaches. During the creation of a play, a coach may use shorthand notations and may use his or her own preferences for the shapes, arrows, and other lines used to represent players, routes, and other play details.

While plays are often created on paper or as a single computer file using some illustration application, plays must be shared with a large number of people. For example, a single offensive American football play involves eleven players. Each of the eleven starting players, a large number of backup players, and coaches must learn the plays.

To learn plays, players and coaches may use special software to view the plays. Players may also seek to group plays based on the routes for the particular position the player is playing. For example, a wide receiver may seek to view only the plays involving one or more of flat routes, slant routes, quick outs, etc., and a running back may seek to view only the plays involving wheel routes, seam routes, blocking routes, etc. In order to quickly group plays based on routes or other information, plays must be uploaded into a computer system and analyzed.

Because there is an infinite number of ways to represent a play on paper, software used to organize plays and teach plays to players should be provided standardized plays. Uploading plays from paper into software applications takes a great amount of time. The typical NFL playbook may comprise hundreds of different plays. Uploading each individual play manually may take an extremely long amount of time, reducing the amount of time players have to learn the plays. As such, what is needed is an automatic way to converting plays as created by coaches or others into digital files capable of being easily shared between players and used by software applications without additional editing.

Figure 6:
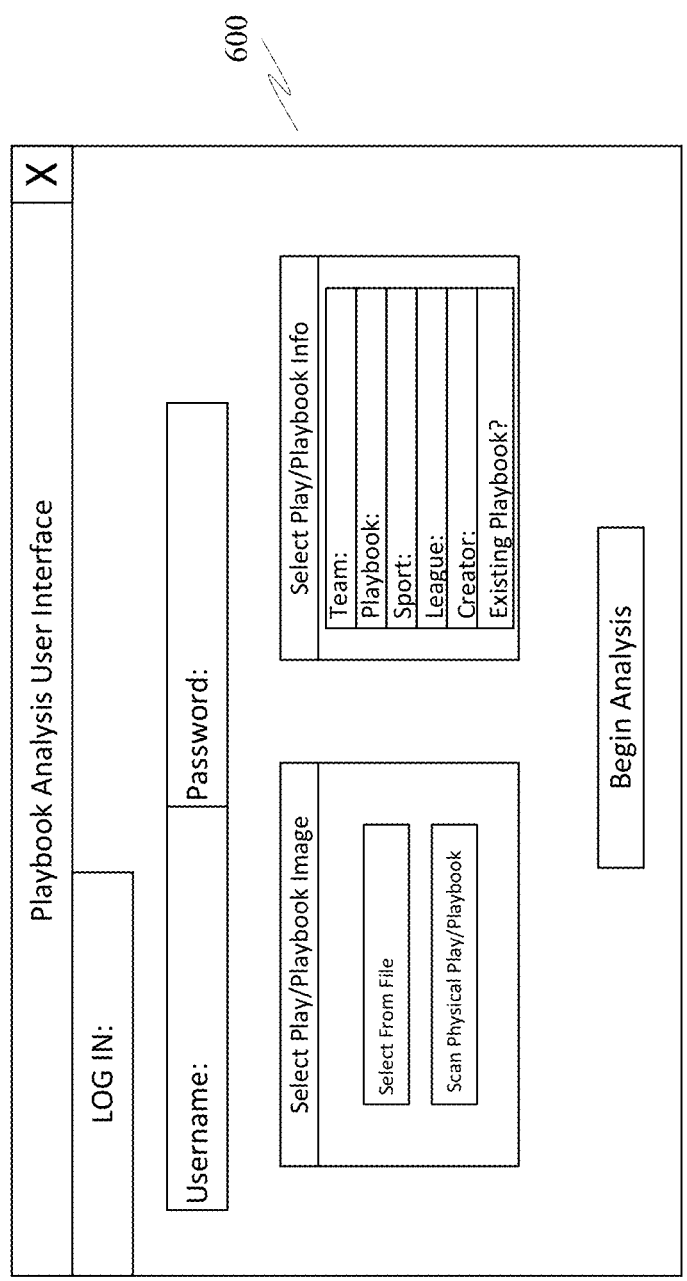
FIG. 6 shows a user interface in accordance with embodiments of the present disclosure.

In some embodiments, a computer system may be used to convert copies of plays as created by coaches or others into digital files capable of being easily shared between players and used by software applications without additional editing. A user interface 600 for adding pre-processed, or raw, plays and/or playbooks may comprise a window on a computer device as illustrated in FIG. 6. The user interface 600 may be displayed on a display in communication with a computing device 100 as illustrated in FIG. 1.

The user interface 600 may enable a user to select a number of options to apply to a play or playbook being uploaded. For example, a user may select a sport associated with the play or playbook, a team name, league, one or more presets, creator name, play or playbook name, whether the play or playbook should be added to an existing set of plays, etc. Users may also add notes related to the play or playbook being uploaded.

Options selected in the upload process may be stored in memory and associated with the play or playbook. Options such as sport and league may be used by the computer system in the analysis. For example, a different artificial intelligence system may be used for different sports, different leagues, etc.

The user interface 600 may also enable a user to select whether the play/playbook to be uploaded to the computer system and analyzed is a computer file existing on the computer system, a computer file at a network location, or a physical file requiring scanning. For example, if a user seeks to select an existing file, an additional dialog window may appear enabling the user to select one or more files containing a play or playbook. Similarly, if a user seeks to select a file from a network location, an additional dialog window may appear enabling the user to select one or more files containing a play or playbook. If a user seeks to scan physical plays or playbooks, a connection to a scanner may be established by the computer system and the user may be guided through steps of copying the plays or playbooks into digital files. Scanning may be performed via an image acquisition device 136 as illustrated in FIG. 1. After scanning the play/playbooks, the computer device may create a digital file with the image data acquired by the image acquisition device 136 and may store the digital file in memory 106, data storage 115, or a network location such as on a server 133 or in external storage 130.

In some embodiments, the play analysis system may be capable of automatically scanning hand-drawn plays from paper, photographs, or other sources and converting such plays to professionally drawn plays.

After selecting options and selecting or scanning one or more plays and/or playbooks, a user may select a begin analysis user interface button initiating the analysis by the computer system of the chosen or scanned plays or playbooks.

The play analysis system may begin by analyzing a digital file and detecting a single play. A single play may be treated by the play analysis system as a separate image file. For example, after detecting a single play, the play analysis system may extract image data relating only to the play. In the example playbook page illustrated in FIG. 5, a total of six plays are illustrated. The play analysis system may detect a single play by first detecting the lines separating the plays. In some embodiments, a single play may be detected by recognizing patterns between the plays. For example, in the playbook page illustrated in FIG. 5, each play comprises the same player symbols. The play analysis system may detect the repetition in the player symbols and use that detection to determine where a play image starts and stops.

The play analysis system may also be capable of detecting information outside the area of the play image containing play related data. For example, as illustrated in FIG. 4, a playbook may include plays printed on off-white or colored background. Plays from other pages may be visible through the page. Lines may separate plays. Information relating to multiple plays may also be on a page. For example, in FIG. 4, the words LEAD 43 appear to refer to the plays OVER STK, OVER WILL, and OVER STK ROBBER, while the words ZONE 24 appear to refer to UNDER WILL, WILL BANDIT, and 55. The play analysis system may be capable of detecting such information and determining which information relates to which play or plays. Similarly, the play analysis system may be capable of detecting a description box such as illustrated in FIG. 4 and determining the description box relates to one or more of plays on the page.

In some embodiments, the play analysis system may comprise removing background image data. For example, as illustrated in FIG. 4, an image file of a play may comprise a colored background and/or feint bleed-through of plays from other pages which appear due to a scanning process, or may comprise other background image data such as watermarks, graphics, etc. The play analysis system may be capable of detecting and removing non-play-specific data from a play image.

Route lines such as receiver routes for passing plays may be recognized by the play analysis system. The computer program as described herein may be capable of recognizing differences between solid and dashed lines, lines with arrows, lines representing blocks, arced and/or curved lines, angled lines, lines representing option routes, etc.

In some embodiments, the play analysis system may be capable of automatically recognizing a representation of depth in the form of yards, steps, and/or numbers on playbook despite any unusual characteristics of a given inputted playbook. A play analysis system as described herein may be capable of automatically cleaning up hand-drawn or otherwise less-precise plays. For example, a play may be placed on a grid of nodes, lines may be straightened, redrawn, etc.

In some embodiments, the play analysis system may be capable of automatically recognizing text on a play and recognizing whether the text represents a play name, a player ID, a route name, coach's notes, or other type of text. Recognized route names on a play may be used for the analysis of other plays. For example, if a route is named in one play of a play book, routes of other plays which match that route and which do not otherwise have a name may be identified by the play analysis system.

In some embodiments, the play analysis system may be capable of automatically scanning and recognizing particular types of plays and particular types of routes, for example the play analysis system may be capable of recognizing certain blocking schemes (Protections and Run Game) when analyzing an American football playbook. In some embodiments, the play analysis system may be capable of recognizing a correct number of players for a play depending on the sport. For example, 11-man NFL, 12-man CFL, 8-man Arena football, 5-man flag-football, etc.

In some embodiments, the play analysis system may be capable of recognizing personnel groups and/or particular formations. For example, the play analysis system may identify players by positions, e.g., running backs, tight ends, wide receivers, full backs, etc. Using the identified players by position, the play analysis system may be capable of determining a personnel group for a given play. In some embodiments, a two-digit numerical system may be used by the play analysis system to label personnel packages. As an example, a first digit may represent a number of running backs identified in a play and a second digit may represent a number of full backs identified in a play. In the example, in the instance of a play in which the play analysis system identifies two running backs and one full back, the play analysis system may label the play as a personnel package of 21. A personnel package label may be stored in memory of the play analysis system. For example, each play may be associated with metadata or a data file storing data such as play name, playbook name, personnel package name, etc.

In some embodiments, the play analysis system may be capable of recognizing field data from a play image file. For example, the play analysis system may recognize left hash marks, middle hash marks, right hash marks, yard markers, five and/or ten yard lines, end zones, etc. The play analysis system may also be capable of adding hash marks, yard lines, etc. and of placing any play at any position on a field.

In some embodiments, the play analysis system may be capable of recognizing QB progressions. For example, a play may have no route lines for a quarterback. Text on the play may indicate instructions or an assignment for a quarterback. The play analysis system may be capable of identifying text relating to assignments or detailed instructions for a quarterback or any other particular player. The play analysis system may record such information in a database. A play may also label receivers with numbers or otherwise label receivers as a hot receiver or a hot-read.

In some embodiments, the play analysis system may be capable of recognizing shades of defenders. For example, a shade of a defender may be represented by a line with a perpendicular intersecting line at the point. The play analysis system may identify which offensive player or players the shade is directed towards. Any information identifiable regarding a shade of a defender may be recorded in a memory file associated with the play. Defensive player shades may be used to categorize plays.

In some embodiments, the play analysis system may be capable of recognizing a point of a run play. For example, a run play may comprise an arrow pointing away from one or more of a running back, quarterback, full back, or receiver. Such an arrow in a run play may represent a route of a runner. The play analysis system may be capable of identifying whether a play is a run play and what direction the arrow representing the route of the runner. Using the direction of the arrow representing the route of the runner, the play analysis system may be capable of determining and recognizing a point of the run play. The point of the run play may be represented by a direction, which defensive players the run is toward, or other identifying information.

In some embodiments, the play analysis system may be capable of recognizing protection routes in a play. For example, blocking players and other players who are not identified in a play as receivers may be associated with lines indicating blocking routes or protection routes. The play analysis system may be capable of recognizing such protection routes in a play. Protection routes, like any other routes, may be used by the play analysis system to categorize a play.

In some embodiments, the play analysis system may be capable of standardizing the format of plays. The play analysis system may change the symbol representing each player according to user preferences or based on standard playbook styles. For example, a square may be set to represent a center. The play analysis system may set a line of scrimmage. In some embodiments, the play analysis system may be capable of automatically editing text. For example, the play analysis system may organize the presentment of notes, titles, and other text on a play illustration.

In some embodiments, the play analysis system may be capable of aligning particular players, for example, linemen may be automatically spaced with equal spacing and centered on the ball. Slot receivers may be lined up a half-body off the ball.

In some embodiments, the play analysis system may resize an image of a play. For example, the play analysis system may take an image file of a play and enlarge or shrink the image such that the size matches the size of other play image files. In some cases, a play may be stretched on a particular axis, for example if the play is more narrow than other plays, etc.

In some embodiments, the play analysis system may be capable of recognizing routes involving crosses or other routes which may be an issue. For example, plays involving receivers whose routes intersect may be identified by the play analysis system and flagged.

In some embodiments, the play analysis system may be capable of learning plays and understanding a coach's mistake. For example, if a player is missing from a play, the play analysis system may add in the missing player based on information from other plays.

In some embodiments, the play analysis system may be capable of recognizing playbooks of other sports and activities, for example cheer, dance, skating, gymnastics, new pop dancing, square dancing, ballroom dancing, etc. In some embodiments, the play analysis system may be capable of teaching, learning, and evaluating dances/routines by video to take subjectivity out of scoring and evaluation.

In some embodiments, the play analysis system may be capable of generating route trees by placement of player on the field and position (RB, WR, TE). For example, the play analysis system may determine a plurality of plays in which a single player has matching position and placement on the field and may create a single visualization of the routes for the player in all of the plays in the plurality of plays.

Figure 7:
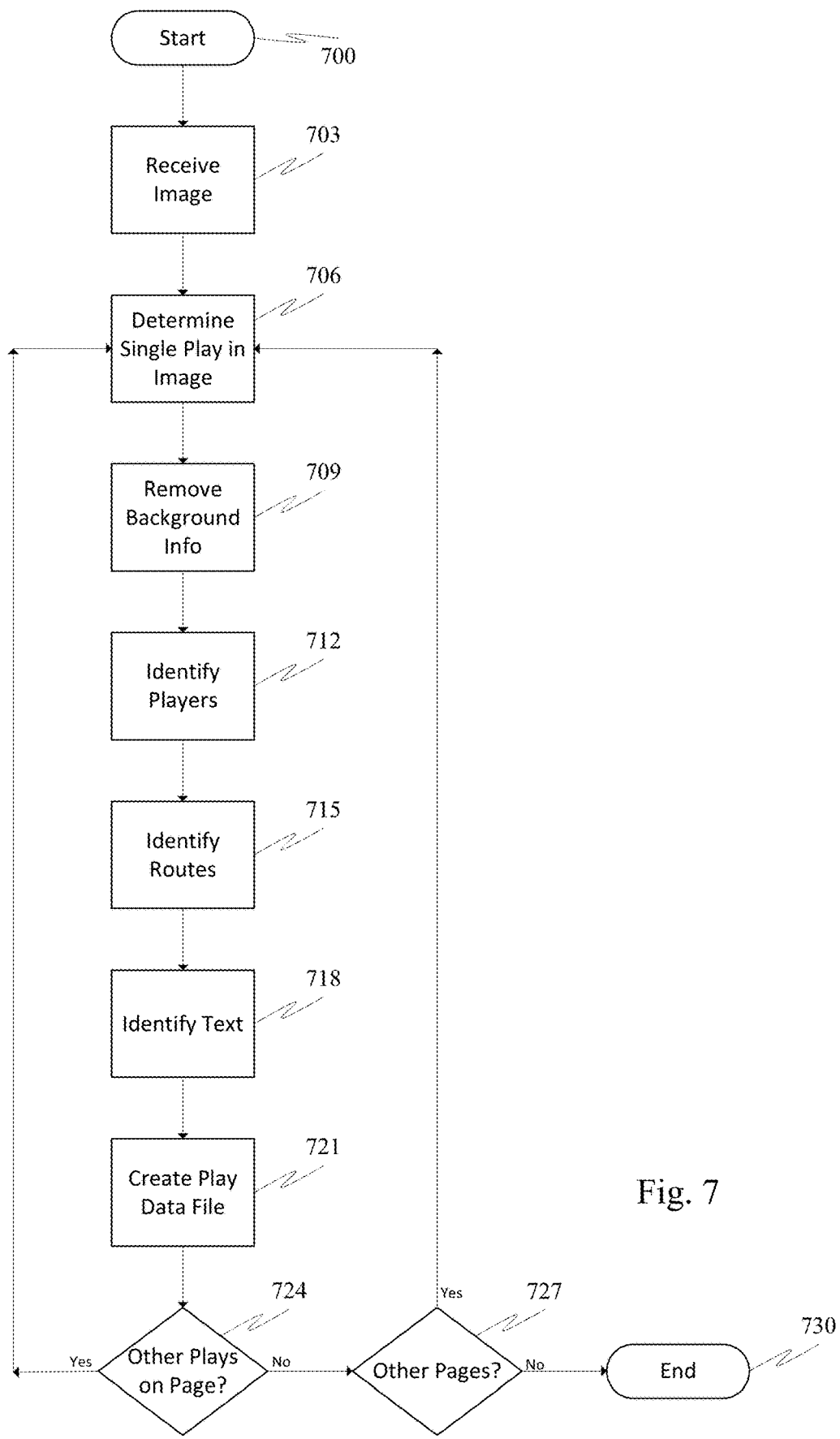
FIG. 7 shows a flowchart of a method in accordance with embodiments of the present disclosure.

As illustrated in FIG. 7, in some embodiments, the play analysis system may execute a method of processing physical and/or pre-processed digital playbooks to create processed digital plays and/or playbooks. The method may be executed using a computer system as described in relation to FIG. 1.

The method may begin at step 700 with a user executing an application on a computer system. The application may appear on the computer system as illustrated by the user interface 600 of FIG. 6. In some embodiments, the user may log-in to the application. The user may execute a front-end application on a user device such as a smartphone, tablet, laptop, desktop etc. The processing may be performed by one or both of a processor of the user device and a processor of a remote computing system such as a server at a network location.

The user may, after initiating the application, begin an upload process of uploading one or more images to the computer system. For example, the user may select one or more image files such as PDFs, PNGs, JPEGs, etc. The user may also, or in the alternative, scan physical images such as by using a scanner, camera, or other image capture system.

The user may also input textual or other information associated with the uploaded images. For example, the user may enter a team name, playbook name, play name, coach name, play creator name, playbook creator name, user ID, password, etc. The user may also enter a name or ID of an existing playbook and/or team with which the newly uploaded images are associated. In some embodiments, image data and text information associated with the image data may be transmitted to an analyzing computer system together.

After image files are selected and/or created, the image files and textual or other information, if any, may be transmitted to a computing device for analysis. At step 703 the analyzing computer may receive the image files and any accompanying information. In some embodiments, the same device as used for the uploading may be used in the analysis and in such embodiments no transmission may be required. The image files and any accompanying information may be stored in memory of one or more of the user device, the computing device, and a server.

To begin the analysis, the analyzing computer, which may be as illustrated in FIG. 1, may detect a single play in a first page of the image file in step 706. For example, if the image file contains multiple pages, the analyzing computer may start with the first page. The analyzing computer may analyze the first page using an artificial intelligence algorithm such as a convolutional neural network to determine boundaries of one or more plays on the first page. In some cases, a first page may contain only one play, while in other cases a first page may contain many plays. In some embodiments, the analyzing computer may determine boundaries of all plays on the first page and may from the determined boundaries select one play of the multiple plays on the first page to analyze first. The analyzing computer may also determine an orientation of the play. For example, the image file may be upside down, sideways, or at another angle. The analyzing computer may crop, resize, and/or reorient the first selected play prior to further analysis.

In some embodiments, prior to analyzing the first play illustration, the analyzing computer may remove non-play related data from a play in step 709. For example, water marks, background images, etc. may be detected by the analyzing computer and digitally removed before further analysis.

After detecting a first play illustration in the image data, the analyzing computer may begin analyzing the first play illustration. Analyzing the first play illustration may comprise detecting shapes corresponding to players, routes, field characteristics etc. For example, the analyzing computer may execute an artificial intelligence algorithm such as a convolutional neural network to detect shapes such as circles, squares, triangles, etc. which may represent players in step 712. The analyzing computer may then associate each shape representing a player with a position.

The analyzing computer may also execute an artificial intelligence algorithm such as a convolutional neural network to detect shapes such as lines, arrows, etc. which may represent routes, blocks, or other types of assignments in step 715. The analyzing computer may then associate each shape representing an assignment with one of the detected shapes associated with a player position.

Analyzing the first play illustration may comprise detecting handwritten and/or typed text within the play and detecting particular shapes associated with particular bodies of text. The analyzing computer may execute an artificial intelligence algorithm such as a convolutional neural network to detect various text throughout a play in step 718. Text may be single characters or abbreviations representing players, or other items in the play, or may be notes such as sentences, names, etc. describing one or more aspects of the play. For example, the analyzing computer may identify text as being a name of a play, a description of the play in general, a note related to a player and/or route, etc. The analyzing computer may relate each body or character of text with a particular player, route, formation, or play characteristic.

Based on identified shapes, the analyzing computer may be capable of detecting certain features of a play. For example, the analyzing computer may detect players, player positions, routes, play name, play notes, route notes, etc. In some embodiments, the analyzing computer may track detected and/or identified players, positions, and other data in a database.

Any information gathered by the analyzing computer related to the first play may be recorded in a database in step 721. Information recorded in the database may be in the form of a data file such as metadata, one or more tables, etc. The information recorded in the database may be such that a new illustration of the play may be generated. For example, a first play illustration may be reproduced based on a data file for the first play in a standard playbook format.

The analyzing computer may also be capable of analyzing multiple plays and creating illustrations based on more than one play. For example, the analyzing computer may generate a route tree for a receiver illustrated in the first play illustration by combining similar routes for a single player from multiple plays.

The information for each play may be associated with other plays. For example, the database may track information such as a playbook associated with one or more of the plays in the database. The database may be used to sort and categorize play datafiles into groups by fields such as team, coach, formation, playbook, etc. For example, a play may be categorized based on one or more of a player route, protection scheme, defensive shade, and play type.

Plays may also be associated with information fields identified and determined by the analyzing computer. For example, the analyzing computer may determine a personnel grouping, formation, offense/defense side, etc. of a play and record such determinations in memory as part of the data file.1

After creating a first data file for a first play in step 721, the analyzing computer may return to analyzing the image file and in step 724 determine if any plays on the page have not been analyzed. If in step 724 the analyzing computer determines any plays on the page have not been analyzed, the analyzing computer may return to step 706 and select another play to analyze. If, in step 724, the analyzing computer determines no plays on the page have not been analyzed, the method may continue to step 727. The analyzing computer may in step 727 detect if the image file is a multipage document and if there are additional pages to review. If the image file is a multipage document and there are additional pages to review, the analyzing computer may select a second play from the first page in step 706 and continue proceeding back through the steps with the next page. The method may continue until all detectable plays within the image file have been analyzed and converted to datafiles. When the analyzing computer, in step 727, detects there are no additional pages to review, the method may proceed to step 730 and end.

Digitally reproduced plays may be stored in memory as part of digital playbooks. Digital playbooks may be accessible to user devices. For example, digital playbooks may be hosted by a central computer, server, or other computing device. User devices such as smartphones, tablets, laptops, desktop computers, etc. may be capable of accessing digital playbooks from the hosting device and viewing and/or downloading digital playbooks from the hosting device. User devices used to access digital playbooks may execute an application to view and/or download the digital playbooks. In some embodiments, users using user devices may login and may be required to verify their identity. By accessing the digital playbooks, a user device may be capable of using a data file of a play to view a reproduced illustration of the first play illustration.

As illustrated in FIG. 8A, a player data file 800 may comprise a table listing players and information on each player as detected for a single play. For example, a player data file 800 may list players by an ID, a field position, a route, a player position, and notes. The player ID may be a randomly set identifier or may correspond to a position of the player as determined by the artificial intelligence system.

The field position of the player may be x, y coordinates of the symbol corresponding to the player. For example, a center may be placed at 0, 0, and a quarterback who is slightly behind the center may be at 0, −2, reflecting that the quarterback and center are aligned at zero on an x axis and the quarterback is two units behind the center.

The route of the player may be data corresponding to a route detected by the analyzing computer. In some embodiments, the data file may comprise an image of the route, a link to a similar route in memory, or other data enabling a computer system to recreate the play illustration.

The player position of the player may be an abbreviation corresponding to a position as recognized by the artificial intelligence system and depending on the sport. For example, in American football, the artificial intelligence system may detect, for an offensive play, a center ("C"), a quarterback ("QB"), a running back ("RB"), etc. The notes may comprise any textual or other information associated with each particular player as detected by the artificial intelligence of the analyzing computer.

As illustrated in FIG. 8B, a play data file 850 may comprise information relating to a play in general, for example a team name, a playbook name, an author of the play, a side of the play, a name of the play, a formation of the play, a personnel grouping of the play, and any general notes relating to the play. The data in the play data file 850 may be as entered by a user upon uploading one or more plays to be analyzed, may be automatically determined by the analyzing computer executing an artificial intelligence system, or a combination thereof. As described herein, a data file for a play may comprise one or both of the player data file 800 and the play data file 850.

Figure 9:
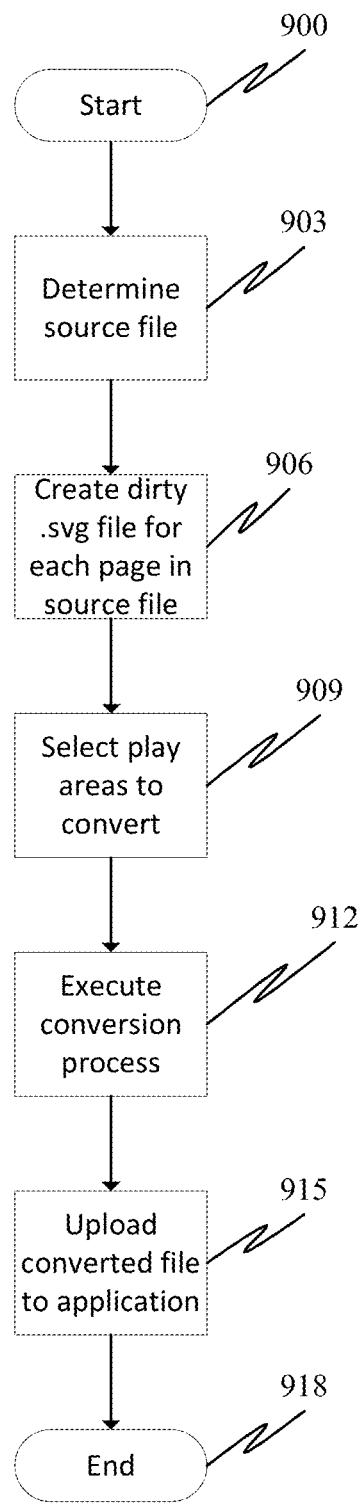
FIG. 9 shows a flowchart of a method in accordance with embodiments of the present disclosure.

In some embodiments, a computer-implemented system may execute a process of streamlining the creation of digital playbooks by enabling a user to upload a playbook in a first filetype, such as a Visio file, which may be automatically converted to a format capable of being viewed and/or edited in a standalone playbook application or other type of application. Such a process may be as illustrated by the flowchart of FIG. 9.

As described herein, an application executed on a computer device such as a smartphone or tablet may be configured to accept a wide variety of formatted playbooks as input data and display such data in a user-friendly format. For example, an application may accept football playbooks created in Microsoft™ Visio™ and convert the football playbooks to a defined graphics format more suitable for web viewing and/or editing. In some embodiments, such an application may be configured to convert .vsd files (vector graphics file format used by Microsoft™ Visio™) to .svg formatted files (Scalable Vector Graphics files) so that the files may be used by a web application designed to view and/or edit playbook files.

Such an application may be useful to a large number of users as many users such as coaches use Visio™ to create playbooks due to Visio™'s expansive toolkit. With Visio™'s expansive toolkit, there are very few bounds on what a user can do to create the football plays in Visio™. This benefit of Visio™ creates an obvious and sizable challenge for applications designed to allow other users to view and/or edit the playbooks. Because of Visio™'s expansive toolkit, such application must be capable of handling a large number of types of inputs. As described herein, a system may be developed in which a computer application may be capable of accepting Visio™ or other file types as inputs and outputting a user-friendly playbook which may be viewed and/or edited via a web application.

In some embodiments, a computer-implemented system may execute a process of accepting a playbook in a first filetype, such as a Visio™ file, as an input, automatically converting the input to a format capable of being viewed and/or edited in a standalone playbook application or other type of application and displaying the converted playbook in a user friendly manner. Such a process may be as illustrated by the flowchart of FIG. 9 and as described below in relation to FIGS. 10A-14C.

The process may begin at step 900 in which a user executing an application on a user device seeks to input a Visio™, or other file type not typically accepted by playbook editing applications, into the application so that a playbook contained in the input file may be viewed and/or edited with the application.

In step 903, the computer application may determine a file to be used as a source. In some embodiments, the source file may be input by a user of the computer application. For example, a user may be presented with a user interface such as that illustrated in FIG. 10A. The user interface may include a prompt inquiring as to a location of the file to be used as an input. Note that while the example illustrated in FIG. 10A indicates the input file is a Visio™ file the systems and methods described herein should not be considered as being so limited. In some embodiments, the user interface presented to the user may also include a prompt asking the user where the output file should be saved.

Figure 10A:
FIG. 10A shows a user interface window in accordance with embodiments of the present disclosure.
Figure 10B:
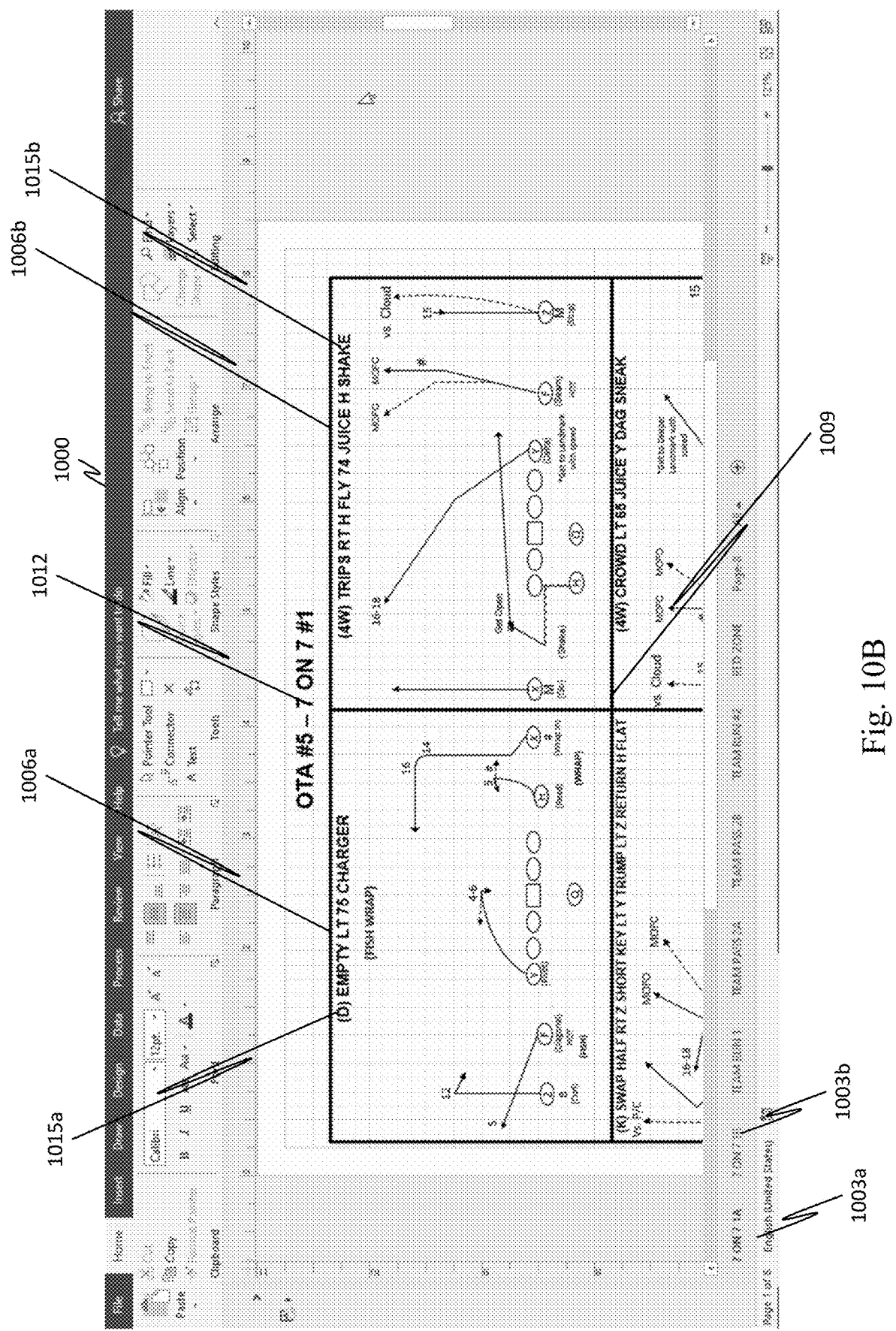
FIG. 10B shows an example Visio™ file in accordance with embodiments of the present disclosure.
Figure 10C:
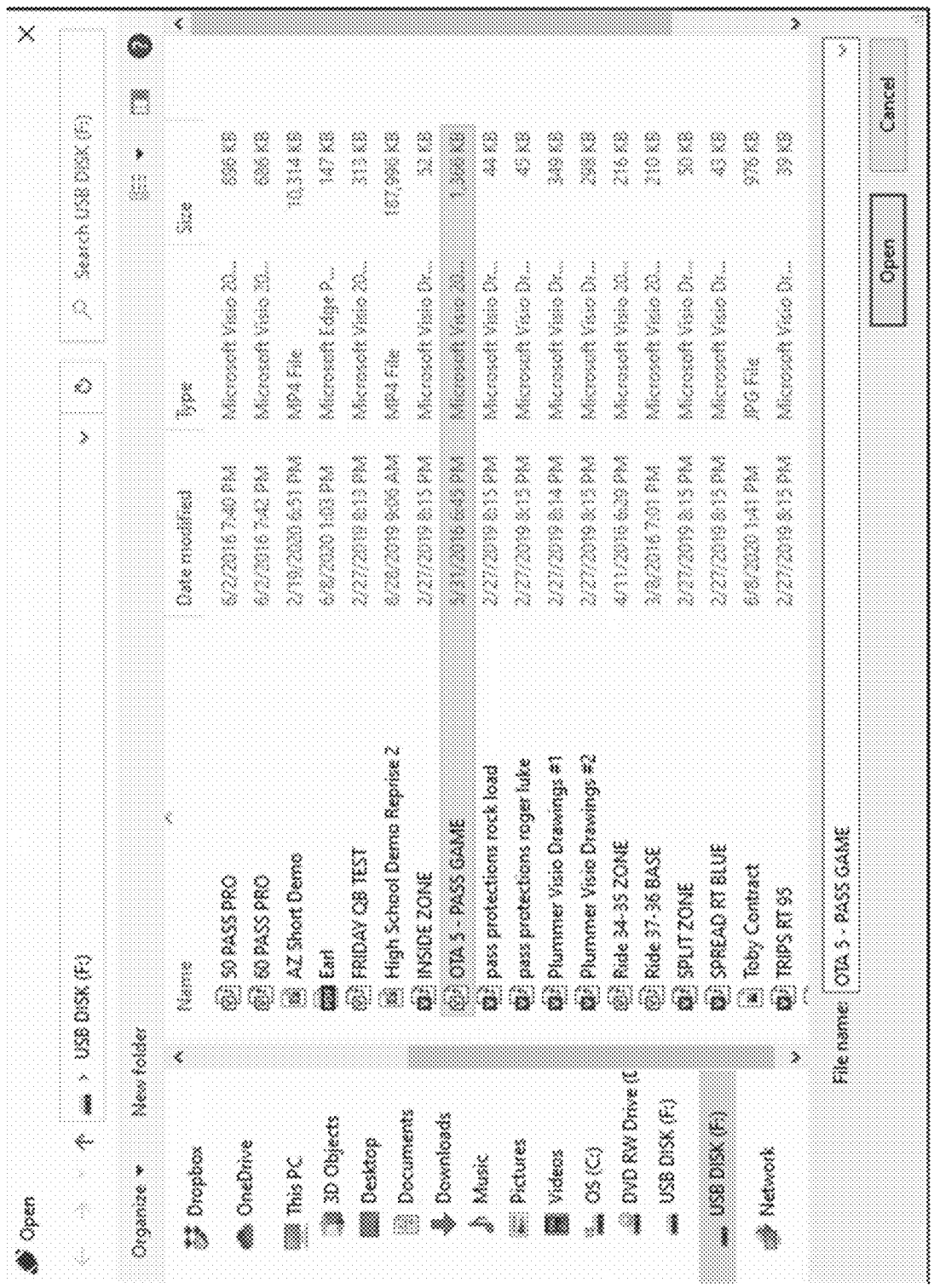
FIG. 10C shows a user interface file navigation window in accordance with embodiments of the present disclosure.

An example of a Visio™ file which may be used as an input in a process such as described in relation to FIG. 9 is illustrated in FIG. 10B. The Visio file illustrated in FIG. 10B is shown as displayed in a user interface 1000. As can be appreciated, an input file may contain a number of pages and/or tabs 1003a, 1003b, each of which may contain one or more plays 1006a, 1006b. Plays on a same page may or may not be delineated by lines 1009 or other indicators. In some embodiments, a page may include a title 1012 while multiple plays on the page may have individual titles 1015a, 1015b. The presently disclosed systems and methods may enable a user to simply upload an entire Visio™ file without worrying about the formatting of each particular page and/or tab included in the file. FIG. 10C illustrates a view of a user interface which may be used by a user browsing a computer file structure to identify a Visio™ or other file type to be used as an input.

Figure 10D:
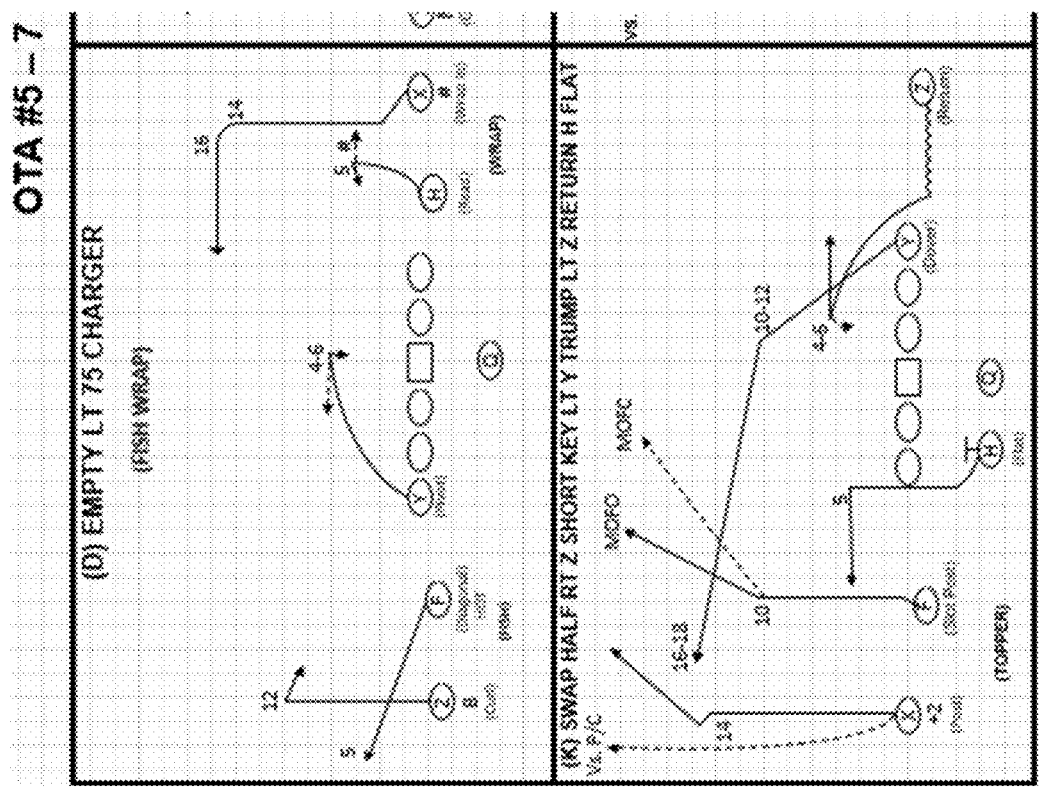
FIG. 10D shows an example Visio™ file in accordance with embodiments of the present disclosure.
Figure 10E:
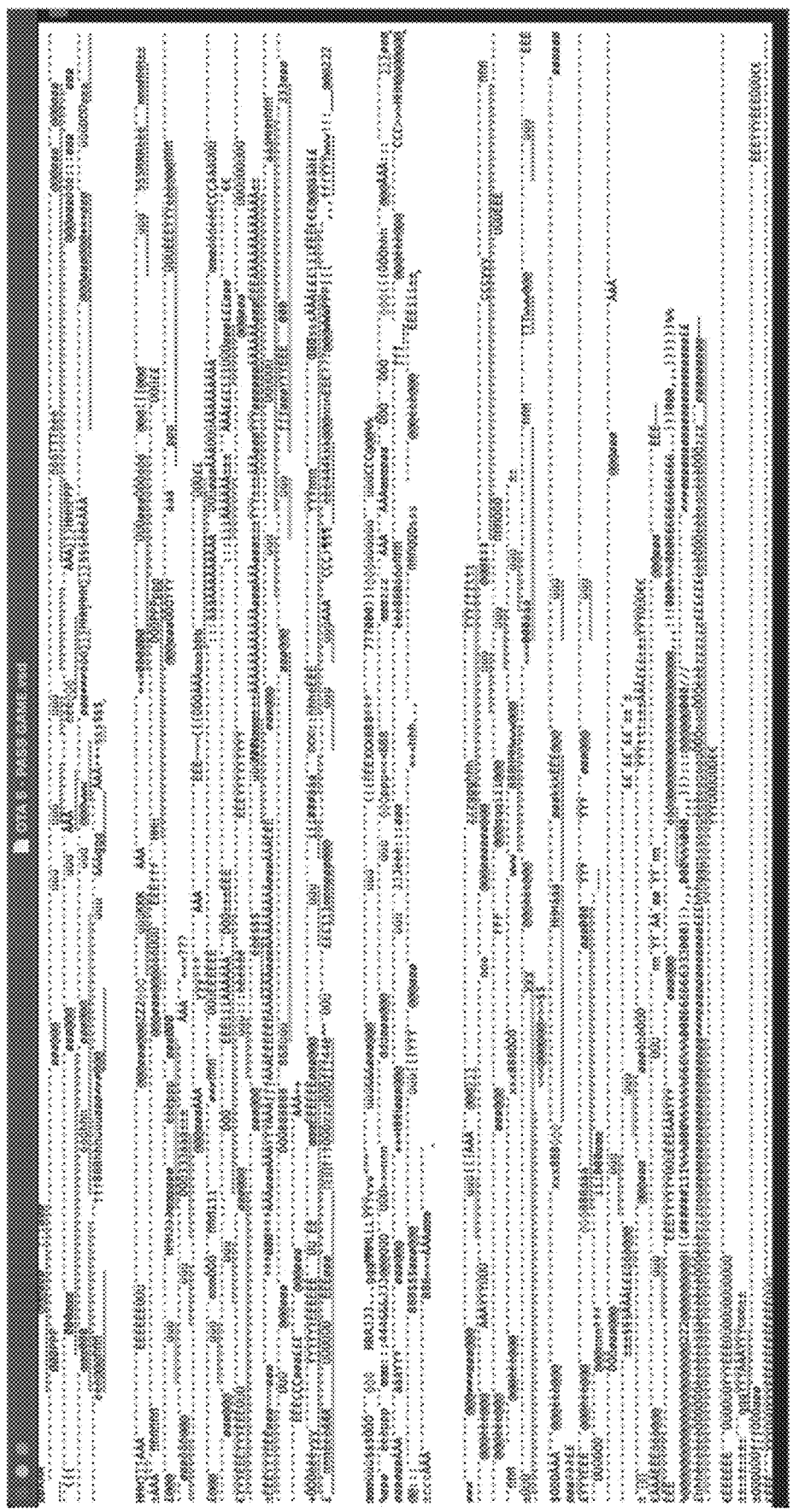
FIG. 10E shows a user interface of a text editor window in accordance with embodiments of the present disclosure.
Figure 11:
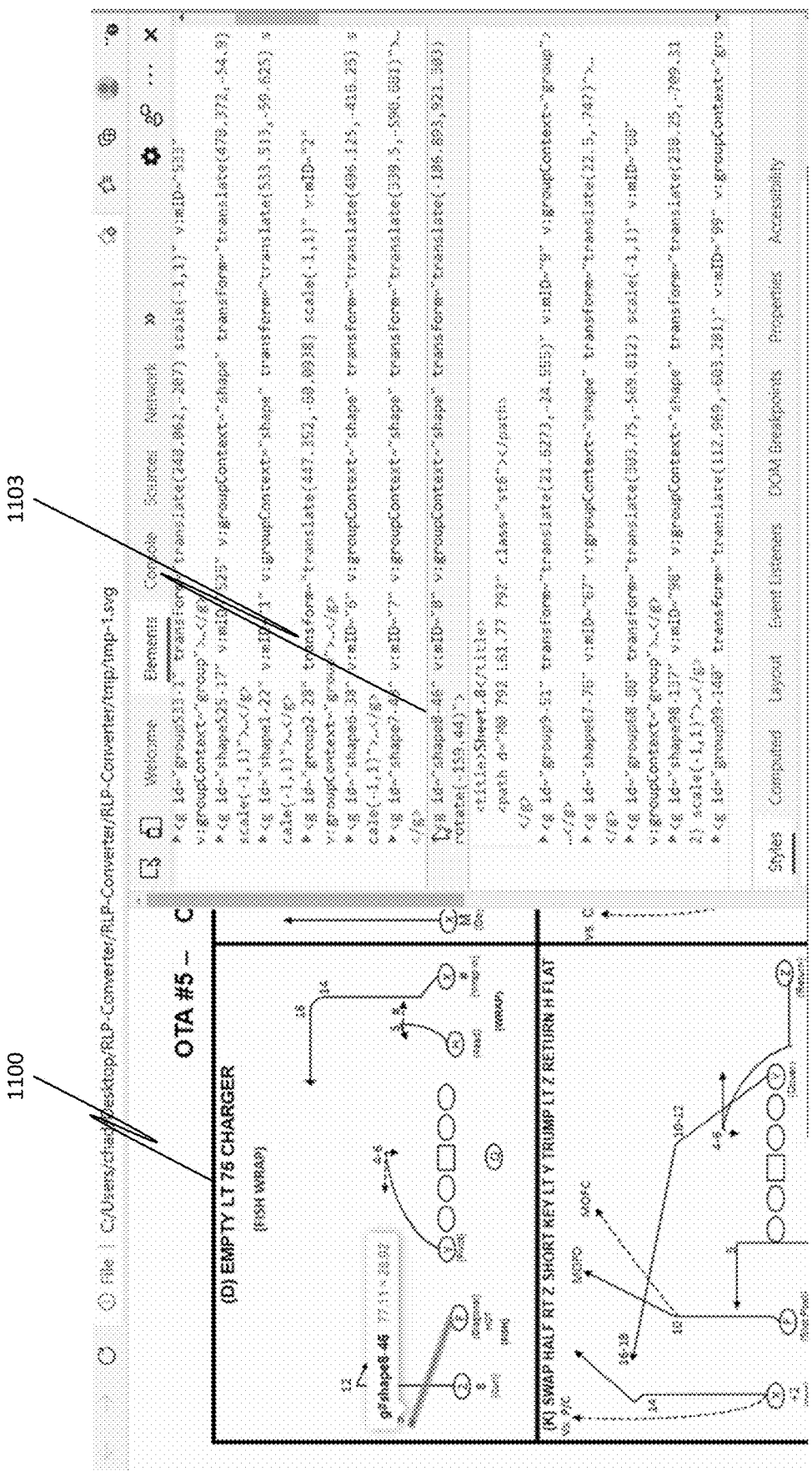
FIG. 11 shows a user interface window in accordance with embodiments of the present disclosure.

FIG. 10D illustrates a zoomed view of plays included in a Visio™ file such as that illustrated in FIG. 10B. As can be appreciated, the data included in such a Visio™ file may be a collection of shapes, points, paths, and text that are objects in the document. Such shapes may be meant to represent aspects of a football play. To an educated recipient (i.e., a football player/coach) of the information, such a collection of objects has meaning and purpose. When opened in a text editor, such as Microsoft™ Notepad™, however, the viewable data is virtually useless as illustrated in FIG. 10E which illustrates a Visio™ file such as that of FIG. 10B when opened in a text editor for purpose of visualization.

In step 906, a new .svg file, described herein as a dirty .svg file, may be created by the computer application for each page and/or tab in the source file. In some embodiments, a Visio™ file may simply be exported as a .svg file. The dirty .svg file created by the computer application may comprise data in an XML structure that can be parsed and analyzed. All objects from the Visio file may be nested within one or more XML nodes, stored as shapes, points, text, and paths. To illustrate the structure of the .svg file, the details of the circled portion of the top left play 1100 in FIG. 11, entitled "(D) EMPTY LT 75 CHARGER," are contained in the selected node 1103 in the XML tree on the right portion of FIG. 11.

In some embodiments, the computer application may be capable of analyzing a page containing a plurality of plays and determining which areas of the page correspond to a particular play. Play areas may be identified by the application such that each play may be analyzed and converted separately. In some embodiments, play areas may be automatically detected using an imaging library. In some embodiments, play names may also be automatically detected, for example by using an optical character recognition (OCR) system. The computer application may further enable users to edit one or both of play areas and play names using an editing application.

Figure 12:
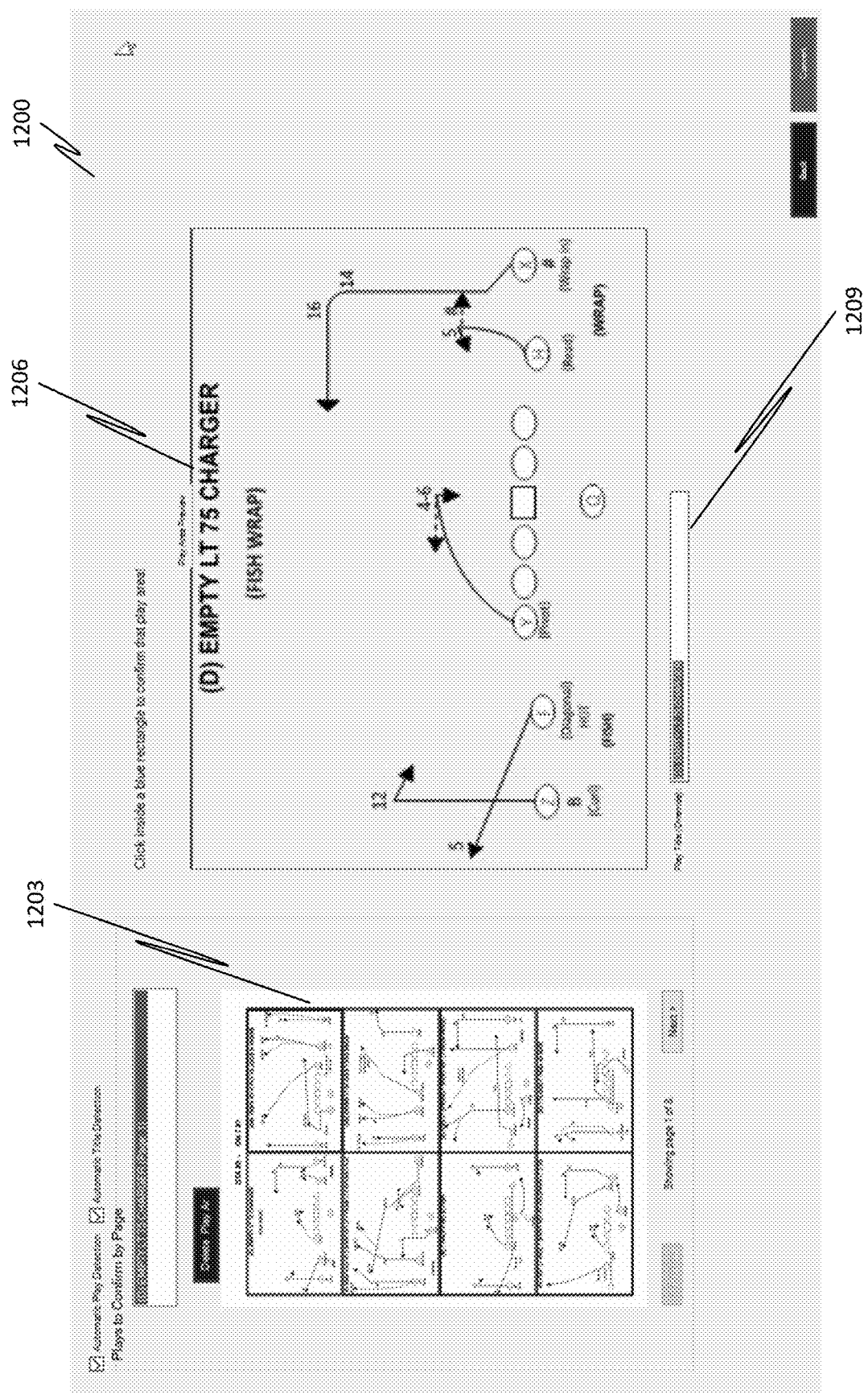
FIG. 12 shows a user interface window in accordance with embodiments of the present disclosure.

For example, as illustrated in FIG. 12, a play selection window 1200 may be presented to a user in a user interface. The play selection window may comprise a copy of a currently selected page 1203 of the source file. The copy of the currently selected page 1203 of the source file may include one or more highlighted play areas for each play detected on the page. Using the play selection window 1200, a user may be enabled to switch between pages and/or select a play within the currently selected page 1203 to review and/or edit. Using the play selection window 12033, a user may be enabled to edit a play area 1206 and title 1209 of a selected play. For example, if the computer application incorrectly detects a particular play area, the user may have the ability to resize the play area to properly include all of the play and no other play. The title 1209 of the selected play as recognized by the computer application may be displayed in an editable text box. Using the text box, a user may edit or replace the recognized title. In some embodiments, a select menu may be presented to the user providing a number of GUI tools to use in the selection and resizing of a play area. The play selection window may also include a display of a copy of a currently selected play from the currently selected page 1203. The play selection window may prompt the user to confirm that automatic play area and/or play name or title detection was correct.

Figure 13:
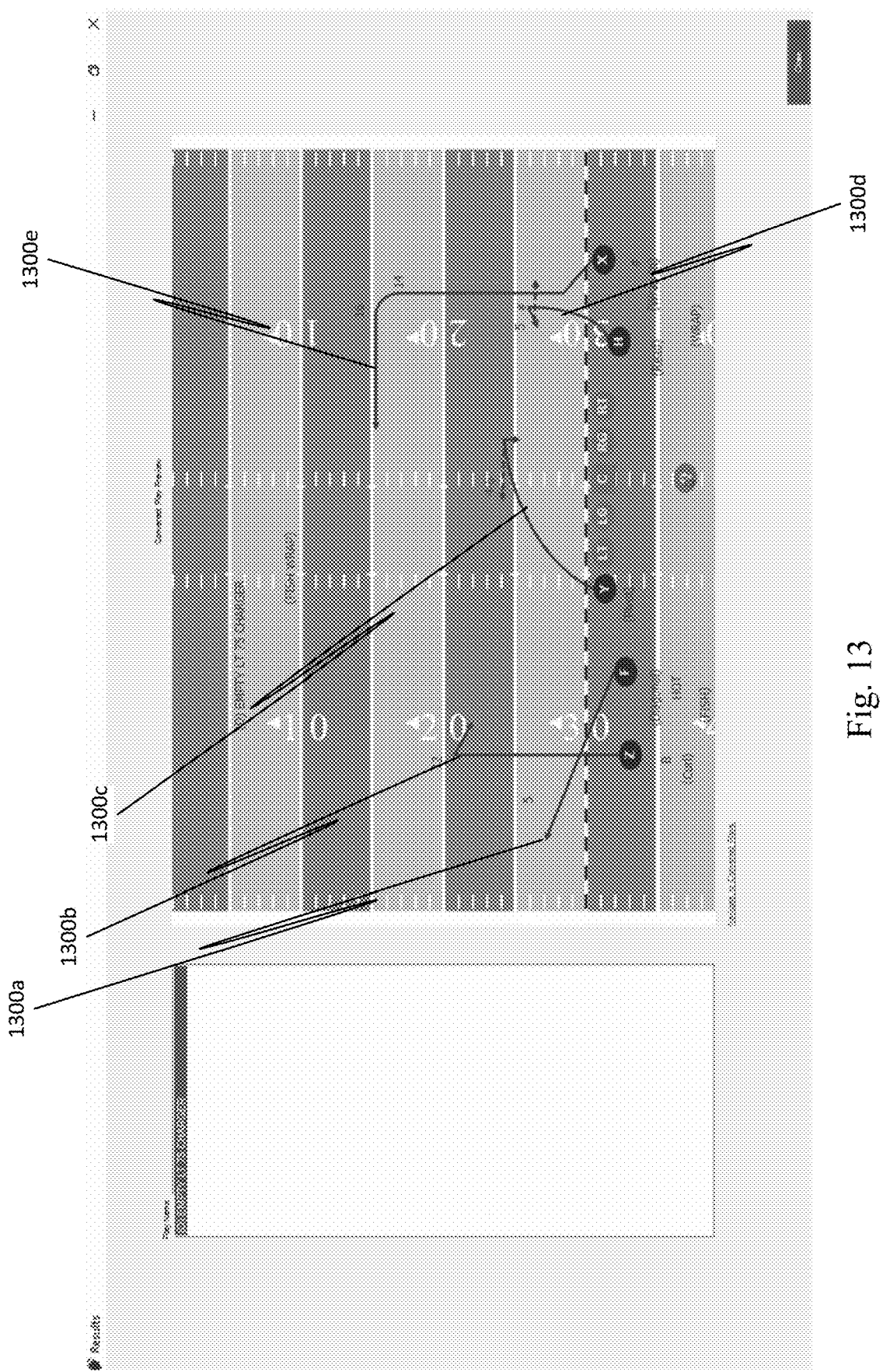
FIG. 13 shows a user interface window in accordance with embodiments of the present disclosure.

In step 912, a conversion process may be executed by the computer application. As illustrated in FIG. 13, certain shapes included in a source file may be interpreted as players based on both on a position of the shape as well as text nested within an XML, node associated with the shape. Because paths, or player routes, in the dirty .svg file may not be attached to a player, paths may not be associated with a particular XML node on the same level of the tree as another shape, point, or other object. Thus, any paths that are detected in the dirty svg may be parsed and analyzed by the computer application to determine a number of factors. For example, the computer application may determine a type of path (e.g., block, route, etc.) and/or whether any other paths which are separate in the XML tree belong to a particular route. For example, in the diagram illustrated in FIG. 13, there are five route groups, 1300*a*, 1300*b*, 1300*c*, 1300*d*, and 1300*e*. Four route groups 1300*b*, 1300*c*, 1300*d*, and 1300*e* comprise multiple segments, i.e., each of the four route groups 1300*b*, 1300*c*, 1300*d*, and 1300*e* comprise a plurality of segments which make up each route. One route group 1300*a* comprises a single line. Due to limitations associated with the quality of .svg files formed from Visio™, segments that belong to a group may not be drawn together with the others, especially within the same XML node.

The computer application may further determine whether any text exists that is associated with any particular route or set of paths. For example, a route may be labelled with text indicating a route pattern, a distance, a player position, or other information. The computer application may be capable of identifying such information and associating the text with a particular path or path set.

In some embodiments, all data may be scaled to fit a new window size depending on the application being used to view and/or edit the output files. For example, the field rectangle dimensions used in Visio™ when the play was drawn may not match the required dimensions of the computer application used to view and/or edit the output file. For this reason, data may be scaled to fit a different resolution or window aspect ratio.

In some embodiments, parsing and analysis of the locations and roles of players in a play may conclude with applying the certain classes that allow them to be styled appropriately in the final viewing, for example, depending on the type of application being used to view and/or edit the output file, different styles may be used to display each play.

For example, when a coach or other user draws a play in an application such as Visio™, objects used to draw the play may not be to scale. Often a coach may simply draw a play in Visio™ or other application in a blank box with no indicators representing a field or other landmark. Notes are often used to label breaking points of route depths, for example 12 yards, etc., but the plays are typically not drawn to scale. The lack of scale, however, creates an issue for importing such documents into a computer application in which plays should be drawn to scale.

In certain embodiments, such an issue may be resolved with one or more different systems and methods for adjusting the scale of plays being imported into a computer application. For example, in some embodiments, an algorithm may be used to identify any notes included in a source file, such as distance notes in a Visio™ drawing or other relevant notes. Using such notes, the software application may be configured to scale each route included in a play in the source file accordingly.

In some embodiments, as opposed to or in addition to using embedded notes in a source file to scale plays and/or routes, users of the software application may be capable of editing routes and/or plays which have been imported into the application to adjust routes to match how the routes should look when drawn to scale. The application may be configured to learn from any such adjustments and may be capable of applying the same or similar changes to the same or similar routes in other plays in a particular playbook.

In some embodiments, as opposed to or in addition to the above, users may be asked to use a route library in the application used to create the source file, such as Visio™. The route library may include a variety of routes drawn to scale which a user such as a coach may be capable of using to design custom plays. The routes included in the route library may be associated with names or identifying metadata. Using a source file conversion process as described herein, the play or plays contained in the source file may be brought into the software application. The application may be configured to recognize each individual route name or identifying metadata from the drawing and design the new play using the same routes from the route library. Such a process may be repeated for all routes (e.g., five routes) in a single play. If any particular route is not drawn in the route library, the application may use other methods of scaling or otherwise adjusting the particular route.

Figure 14A:
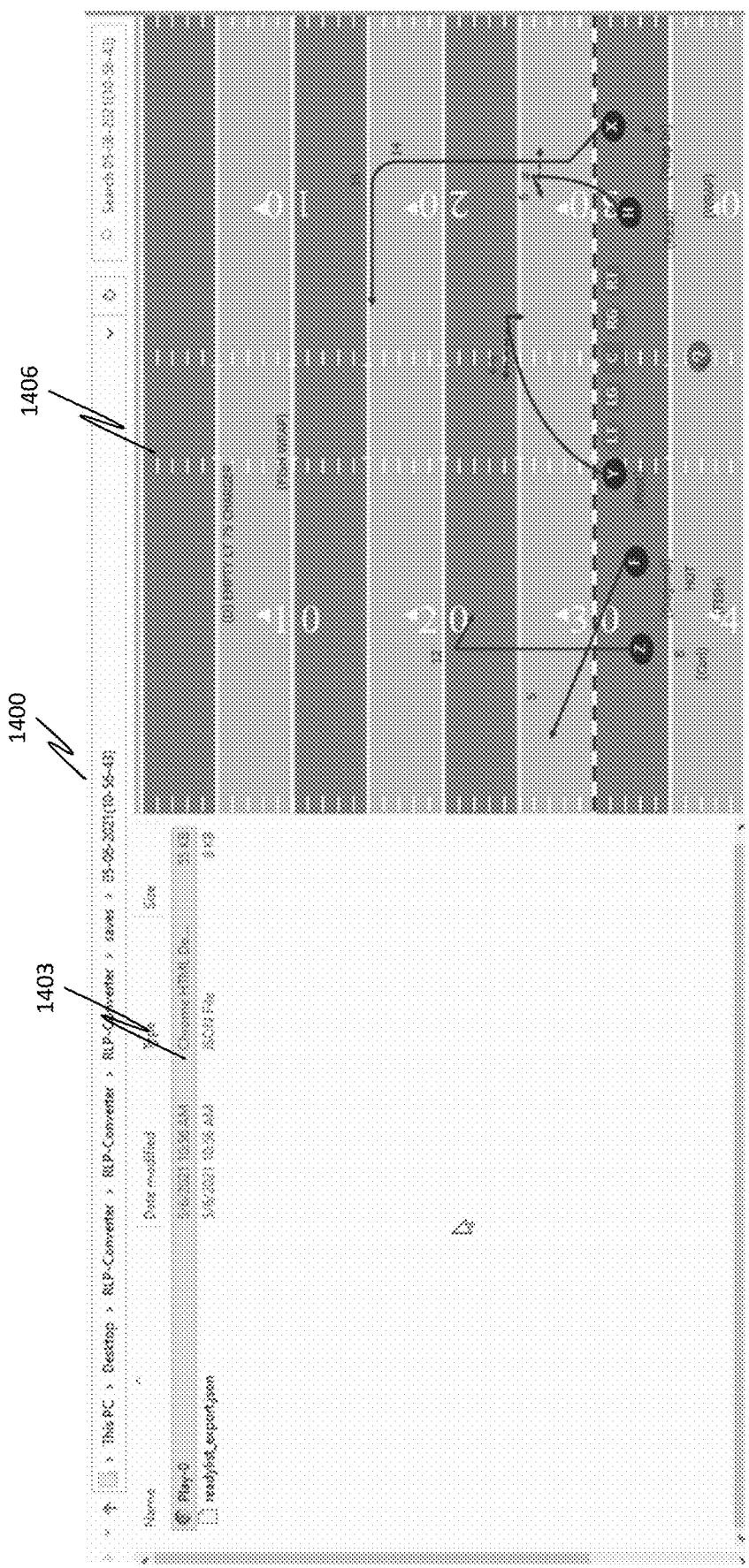
FIG. 14A shows a user interface window in accordance with embodiments of the present disclosure.

In step 915, the converted file may be uploaded or otherwise sent for display on the user interface displayed by the application executing on the user's computer system. As illustrated in FIG. 14A, a viewer window may be presented on a display of the user's computer system. The viewer window may include a file browser window 1403 such that a user may be capable of selecting between a number of different plays to view in a play viewer window 1406. The play viewer window 1406 may be used to display a selected play in its converted format. As illustrated in FIG. 14A, the browser window 1403 may display links to an output file (such as an html file), depicted as being selected for display in the play viewer window 1406 in FIG. 14A, as well as a .json file which may be capable of being uploaded into a web app.

Figure 14B:
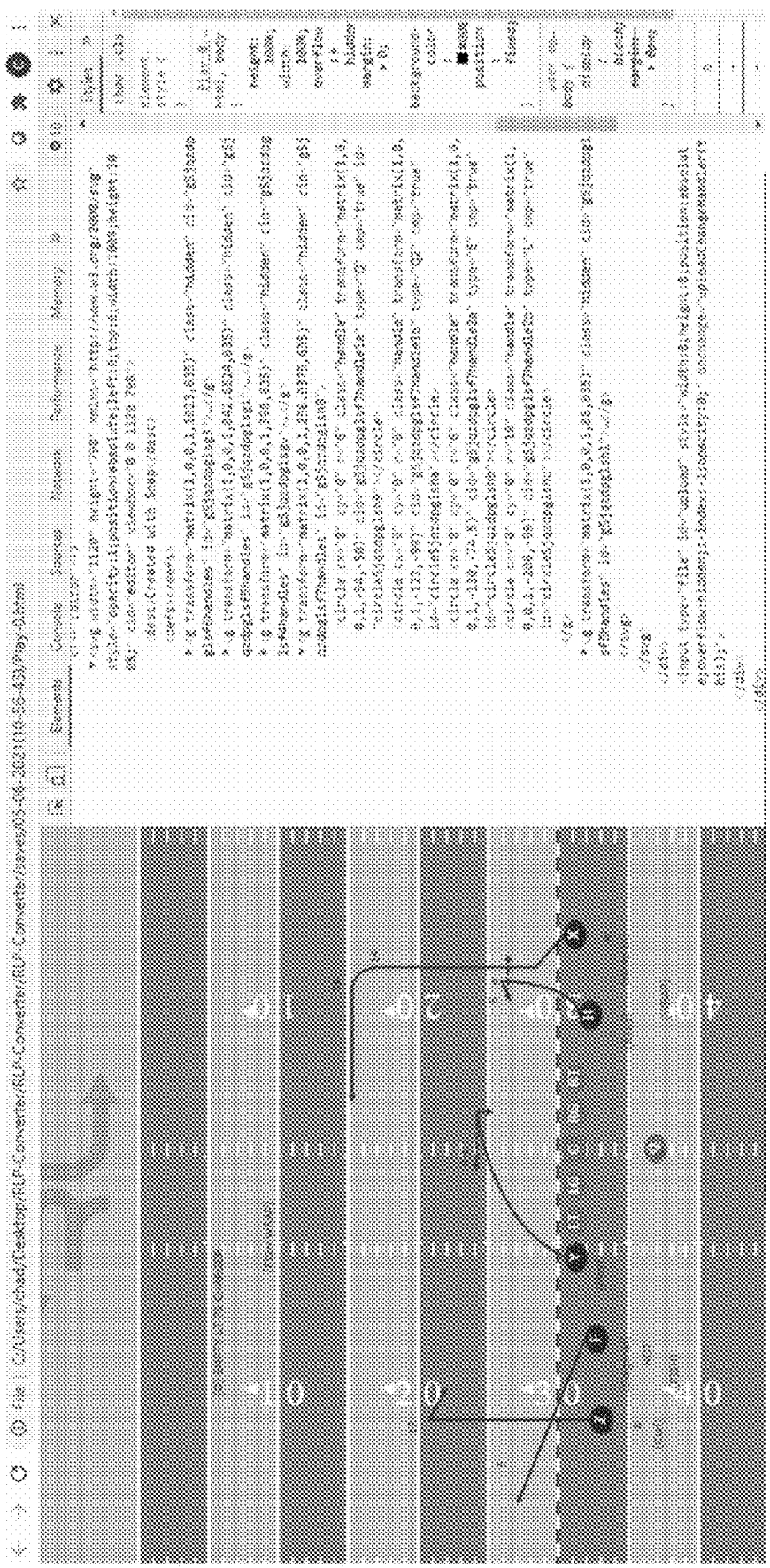
FIG. 14B shows a user interface window in accordance with embodiments of the present disclosure.

FIG. 14B provides an illustration of an html file which may be output by a computer application as described herein. The styled .html file may be visually displayed as an illustration of the play and/or the text of the html file may be displayed. For illustration purposes, a circle is shown over the second player from the left which is associated with the data in the selected node on the right side of the figure.

Figure 14C:
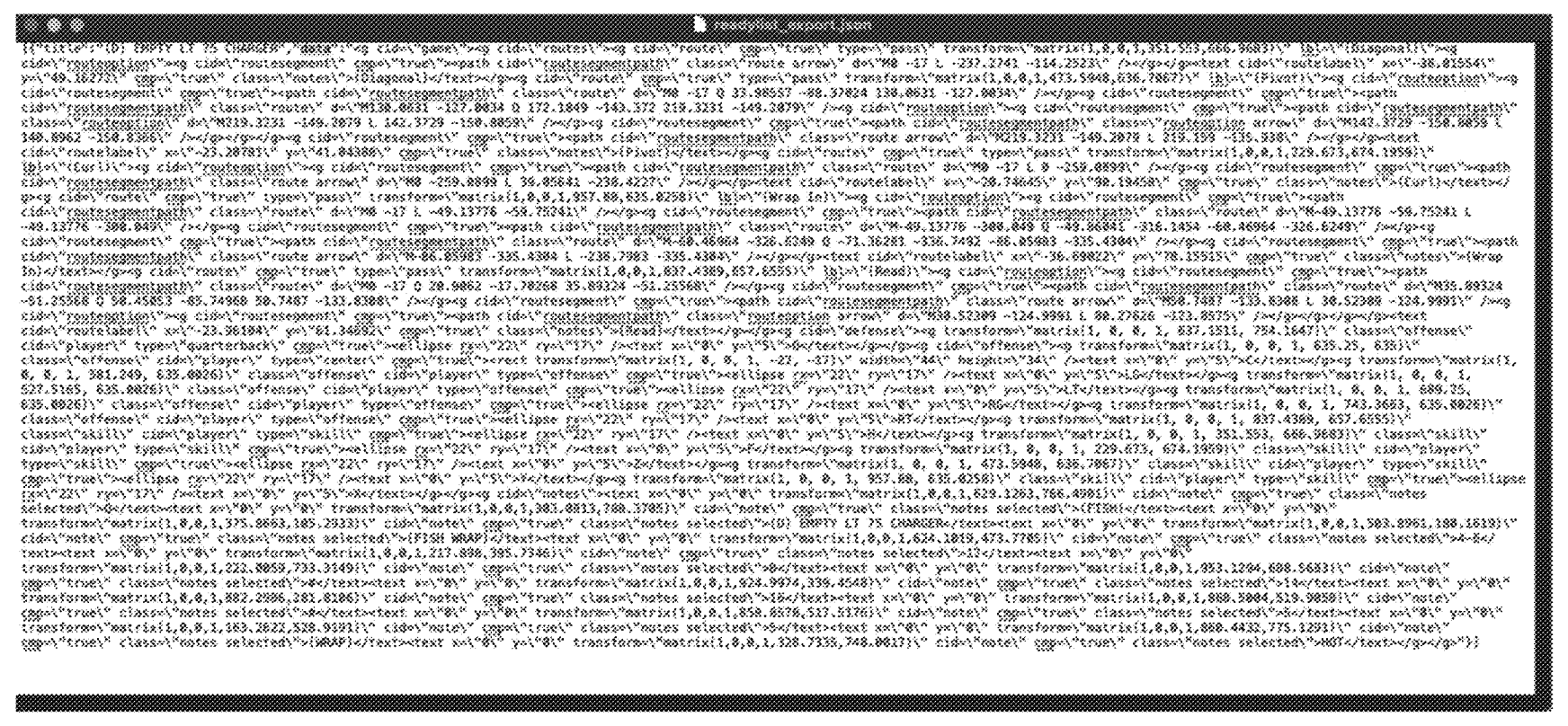

FIG. 14C illustrates a j son file which may be output by a computer application as described herein. In some embodiments, a j son may comprise contains a title of a play as well as any and all data extracted from the source file, such as any un-styled .svg data. Such a .json file may be used in any number of computer applications for displaying and/or editing playbook files.

In step 918, the process may end. In some embodiments, the user may be notified when the conversion process has been computed. The output .html, .json, or other filetype may be displayed on the user device of the user executing the application.

In certain embodiments, the play analysis system and methods as disclosed herein can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Any of the steps, functions, and operations discussed herein can be performed continuously and automatically.

The exemplary play analysis system and methods as disclosed herein have been described in relation to a computer system. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments of the play analysis system and methods as disclosed herein illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Certain embodiments of the present disclosure include a method for automatically creating a digital playbook, the method comprising: receiving, via a processor, image data; storing, by the processor, the image data in memory; detecting, by the processor, a first play illustration in the image data; analyzing, by the processor, the first play illustration; based on the analysis of the first play illustration, detecting, by the processor, features of the play, the features comprising one or more of players, routes, play name, and play notes; generating, by the processor, a data file for the first play; and storing, by the processor, the data file for the first play in memory.

Aspects of the above method include wherein the image data comprises a scanned copy of a playbook.

Aspects of the above method include wherein prior to analyzing the first play illustration, the method comprises removing non-play related data from the first play illustration.

Aspects of the above method include the method further comprising generating a second data file for a second play illustration in the image data.

Aspects of the above method include wherein the data file for the first play illustration comprises information relating to one or more of a personnel grouping and or a formation of the first play illustration.

Aspects of the above method include the method further comprising reproducing the first play illustration based on the data file for the first play in a standard playbook format.

Aspects of the above method include the method further comprising adding the data file to a digital playbook in memory.

Aspects of the above method include wherein the digital playbook is accessible to one or more user devices.

Aspects of the above method include wherein the one or more user devices use the data file to view a reproduced illustration of the first play illustration.

Aspects of the above method include the method further comprising generating a route tree for a receiver illustrated in the first play illustration.

Aspects of the above method include the method further comprising categorizing the play based on one or more of a player route, protection scheme, defensive shade, and play type.

Aspects of the above method include the method further comprising receiving textual information associated with the image data.

Aspects of the above method include wherein the textual information comprises one or more of a playbook name, a coach name, and a team name.

Embodiments include a system, comprising: a processor; and a memory coupled to the processor and comprising computer readable program code that when executed by the processor causes the processor to perform operations comprising: receiving, via the processor, image data; storing, by the processor, the image data in memory; detecting, by the processor, a first play illustration in the image data; analyzing, by the processor, the first play illustration; based on the analysis of the first play illustration, detecting, by the processor, features of the play, the features comprising one or more of players, routes, play name, and play notes; generating, by the processor, a data file for the first play; and storing, by the processor, the data file for the first play in the memory.

Aspects of the above system include wherein the image data comprises a scanned copy of a playbook.

Aspects of the above system include wherein prior to analyzing the first play illustration, the method comprises removing non-play related data from the first play illustration.

Aspects of the above system include wherein the computer readable program code further causes the processor to perform operations comprising generating a second data file for a second play illustration in the image data.

Embodiments include a computer program product, comprising: a non-transitory computer readable storage medium having computer readable program code embodied therewith, the computer readable program code configured, when executed by a processor, to: receive, via the processor, image data; store, by the processor, the image data in memory; detect, by the processor, a first play illustration in the image data; analyze, by the processor, the first play illustration; based on the analysis of the first play illustration, detect, by the processor, features of the play, the features comprising one or more of players, routes, play name, and play notes; generate, by the processor, a data file for the first play; and storing, by the processor, the data file for the first play in memory.

Aspects of the above computer program product include wherein the image data comprises a scanned copy of a playbook.

Aspects of the above computer program product include wherein prior to analyzing the first play illustration, the method comprises removing non-play related data from the first play illustration.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably, and include any type of methodology, process, mathematical operation, or technique.

What is claimed is:

1. A method for automatically creating a digital playbook, the method comprising:
   receiving, via a processor, non-standardized image data;
   storing, by the processor, the image data in memory;
   executing a neural network that utilizes machine learning to analyze the image data;
   based on the analyzing of the image data by the neural network, detecting a first play illustration in the image data, the first play illustration comprising one or more of players, routes, play name, and play notes;
   converting, by the processor, the non-standardized image data into a data file for the first play; and
   using the data file to display a reproduced illustration of the first play.

2. The method of claim 1, wherein the image data comprises a scanned copy of a playbook.

3. The method of claim 1, wherein prior to analyzing the first play illustration, the method comprises removing non-play related data from the first play illustration.

4. The method of claim 1, further comprising generating a second data file for a second play illustration in the image data.

5. The method of claim 1, wherein the data file for the first play illustration comprises information relating to one or more of a personnel grouping and or a formation of the first play illustration.

6. The method of claim 1, wherein the image data comprises a copy of a hand-drawn play.

7. The method of claim 1, further comprising adding the data file to a digital playbook in memory.

8. The method of claim 7, wherein the digital playbook is accessible to one or more user devices.

9. The method of claim 1, wherein the data file comprises one or more of an SVG file, an HTML, file, and a JSON file.

10. The method of claim 1, further comprising generating a route tree for a receiver illustrated in the first play illustration.

11. The method of claim 1, further comprising categorizing the play based on one or more of a player route, protection scheme, defensive shade, and play type.

12. The method of claim 1, further comprising receiving textual information associated with the image data.

13. The method of claim 12, wherein the textual information comprises one or more of a playbook name, a coach name, and a team name.

14. A system, comprising:
   a processor; and a memory coupled to the processor and comprising computer readable program code that when executed by the processor causes the processor to perform operations comprising:
  receiving, via the processor, non-standardized image data;
  storing, by the processor, the image data in memory;
  executing a neural network that utilizes machine learning to analyze the image data;
    based on the analyzing of the image data by the neural network, detecting a first play illustration in the image data, the first play illustration comprising one or more of players, routes, play name, and play notes;
    converting, by the processor, the non-standardized image data into a data file for the first play; and
    using the data file to display a reproduced illustration of the first play.

15. The system of claim 14, wherein the image data comprises a scanned copy of a playbook.

16. The system of claim 14, wherein prior to analyzing the first play illustration, the operations comprise removing non-play related data from the first play illustration.

17. The system of claim 14, wherein the computer readable program code further causes the processor to perform operations comprising generating a second data file for a second play illustration in the image data.

18. A computer program product, comprising:
  a non-transitory computer readable storage medium having computer readable program code embodied therewith, the computer readable program code configured, when executed by a processor, to:
  receive non-standardized image data;
  store the image data in memory;
  execute a neural network that utilizes machine learning to analyze the image data;
  based on the analyzing of the image data by the neural network, detect a first play illustration in the image data, the first play illustration comprising one or more of players, routes, play name, and play notes;
  convert the non-standardized image data into a data file for the first play; and
  use the data file to display a reproduced illustration of the first play.

19. The computer program product of claim 18, wherein the image data comprises a scanned copy of a playbook.

20. The computer program product of claim 18, wherein prior to analyzing the first play illustration, processor removes non-play related data from the first play illustration.

* * * * *